(12) United States Patent
Tsunoda

(10) Patent No.: US 8,284,445 B2
(45) Date of Patent: Oct. 9, 2012

(54) IMAGE FORMING APPARATUS FOR FORMING IMAGES FROM OBJECTS

(75) Inventor: Masami Tsunoda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1174 days.

(21) Appl. No.: 11/673,535

(22) Filed: Feb. 9, 2007

(65) Prior Publication Data

US 2007/0195353 A1 Aug. 23, 2007

(30) Foreign Application Priority Data

Feb. 17, 2006 (JP) .................... 2006-041657

(51) Int. Cl.
*G06K 1/00* (2006.01)
*G06F 3/12* (2006.01)
(52) U.S. Cl. .......... 358/1.9; 358/2.1; 358/1.15; 382/180
(58) Field of Classification Search .............. 358/1.9, 358/2.1, 1.15; 710/200, 235, 250, 249, 251, 710/276; 382/180
See application file for complete search history.

(56) References Cited

U.S. PATENT DOCUMENTS 5,619,624 A * 4/1997 Schoenzeit et al. ........... 345/418

FOREIGN PATENT DOCUMENTS

| JP | 10-011593 A | 1/1998 |
| JP | 2001-293913 A | 10/2001 |

\* cited by examiner

*Primary Examiner* — Thomas Lett
(74) *Attorney, Agent, or Firm* — Rossi, Kimms & McDowell LLP

(57) ABSTRACT

According to the claimed invention, an image forming apparatus comprises an image forming unit which forms an image represented by data of a specific format; a reception unit which receives print data of each page containing object data representing each of a plurality of types of objects; a data rasterization unit which has object conversion units which convert the object data into data of the specific format; a composition unit which composites data of the specific format corresponding to the object data converted to page data of the specific format containing the object data; and a control unit which inputs the page data to a subsequent processing unit for each page to use the page data for image formation by the image forming unit, wherein the data rasterization unit converts object data into data of the specific format regardless of a break of each page containing the object data.

11 Claims, 19 Drawing Sheets

IMAGE FORMING APPARATUS FOR FORMING IMAGES FROM OBJECTS

BACKGROUND OF THE INVENTION

1. Field of the Invention

The present invention relates to an image forming apparatus which forms an image corresponding to print data that is generated by a computer or the like and formed from an image object.

2. Description of the Related Art

One approach to increase the document generation productivity is to increase the operating speed of hardware of an image forming apparatus such as a printer. However, no dramatic increase in the operating speed of a semiconductor integrated circuit which is the core of hardware is expected in the future. Instead, expectations are growing for a parallel processing technique of parallel-performing data processes of the same type by a plurality of hardware devices. For example, there is proposed a technique of analyzing print job data in a printing apparatus and parallel-executing image rendering instructions divided by a job sequence generation means by a plurality of rendering means (see patent reference 1). There is also a technique of processing an image by an image processing device out of rendering data of an input text, graphics, and image to generate bitmap data, and processing the text and graphic by the CPU to generate bitmap data (see patent reference 2).

[Patent Reference 1] Japanese Patent Laid-Open No. 10-011593

[Patent Reference 2] Japanese Patent Laid-Open No. 2001-293913 (paragraphs 0039 to 0042)

However, according to the prior arts, processes such as data conversion are so scheduled as to shorten the process time of one page. Scheduling is not always optimal for each print job having a plurality of pages, and there is room for improvement to shorten the process time of each print job.

As image forming apparatuses are shared more and more with the spread of network printers and the like, a plurality of print jobs are successively processed more and more. In this case, processes in the image forming apparatus must be so scheduled as to shorten the process time of all print jobs.

SUMMARY OF THE INVENTION

The present invention has been made in consideration of the above situation, and has as its object to solve the above problems. More specifically, it is an object of the present invention to provide an image forming apparatus capable of increasing the operation efficiency of conversion units arranged to rasterize print data containing a plurality of types of objects, and executing a print process based on print data of pages at high speed.

In order to achieve the above object, the present invention comprises the following arrangement. That is, an image forming apparatus comprises an image forming unit, adapted to form an image represented by data of a specific format on a medium on the basis of the data, a reception unit, adapted to receive, from an external apparatus, print data of each page containing object data representing each of a plurality of types of objects, a data rasterization unit having, for the respective types of objects, object conversion units, adapted to convert the object data into data of the specific format, a composition unit, adapted to composite data of the specific format corresponding to the object data converted by the plurality of object conversion units, to page data of the specific format containing the object data, and a control unit, adapted to input the page data composited by the composition unit to a subsequent processing unit for each page to use the page data for image formation by the image forming unit, wherein the data rasterization unit converts object data received by the reception unit into data of the specific format regardless of a break of each page containing the object data.

This arrangement can increase the operation efficiency of conversion units arranged to rasterize print data containing a plurality of types of objects, and execute a print process based on print data of pages at high speed.

Further features of the present invention will become apparent from the following description of exemplary embodiments with reference to the attached drawings.

DESCRIPTION OF THE EMBODIMENTS

First Embodiment

<General Description of Apparatuses>

Figure 1:
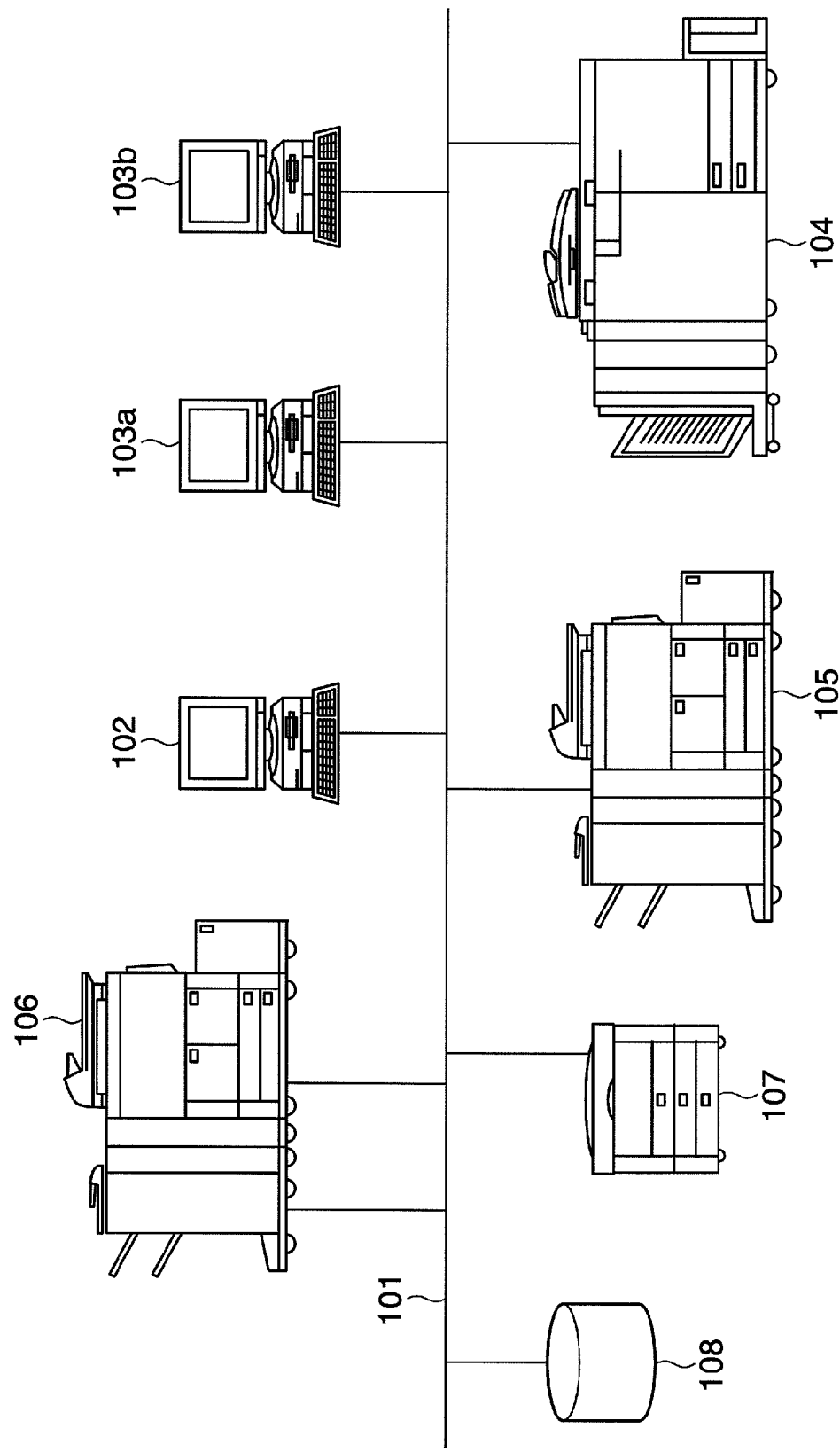
FIG. 1 is a view showing an overall system in an embodiment.

FIG. 1 is a schematic view showing apparatuses in the first embodiment of the present invention. Computers 102 and 103 connected to a network 101 function as a server and client, respectively. In practice, the number of clients 103 may be one or three or more. FIG. 1 shows clients 103a and 103b, and they will be represented as the client 103. In the first embodiment, both the server 102 and client 103 are general-purpose computers functioning as clients of an image forming apparatus, and will be referred to as the computer 102 at once.

Multipurpose network apparatuses 104, 105, and 106 called MFPs (Multi Function Peripherals) also connect to the network 101. The MFP 104 is a color MFP capable of scanning and printing in full color. The MFPs 105 and 106 are monochrome MFPs which scan and print in monochrome.

A single-function printer 107 also connects to the network 101. The single-function printer 107 is equivalent to the above-mentioned MFP in terms of the operation of a printer (i.e., image forming apparatus) in the embodiment, so these apparatuses will be referred to as MFPs at once.

A memory device 108 is, e.g., a hard disk which is connected to a network and stores data. The memory device 108 can temporarily save or store various data sent via the network 101. For example, the memory device 108 is, e.g., a hard disk of a server connected to and shared by the network. Although not shown in FIG. 1, other apparatuses such as a scanner, printer, and FAX machine are also connectable to the network in addition to clients, various servers, and other MFPs.

So-called DTP (Desk Top Publishing) application software runs on the computer 102 to generate and edit various documents. A document contains a text and image objects such as an image and graphics. The computer 102 converts a generated document into print data described in the PDL (Page Description Language) by software called a printer driver. The computer 102 outputs the converted print data to the MFPs 104, 105, and 106 via the network 101. For descriptive convenience, the first embodiment uses the MFP 104 as an image forming apparatus. The same results can also be obtained using another MFP.

A document on the scanner unit of the MFP 104 can also be scanned as electronic data using software called a scanner driver installed in the computer 102. The user can save scanned electronic data in the memory device 108 via the network 101, display it on the display of the computer 102, or send it to the MFP 104 to output the electronic data.

The MFP 104 comprises a communication means capable of exchanging information with the computer 102 via the network 101. The communication means sequentially notifies the computer 102 of the setting information and apparatus state of the MFP 104. The computer 102 comprises utility software which runs upon reception of information from the MFP 104. The computer 102 centralizes devices such as the MFP 104.

<Arrangement of MFPs 104, 105, and 106>

The arrangements of the MFPs 104, 105, and 106 will be described with reference to FIGS. 2 to 13. The MFPs 104 and 105 are different only in which of full color and monochrome is supported, and a full-color apparatus often contains the arrangement of a monochrome apparatus except for the color process. Thus, only the MFP 104 serving as a full-color apparatus will be explained, and a description of the monochrome process will be added, as needed. The MFP 106 is identical to the MFP 105.

Figure 2:
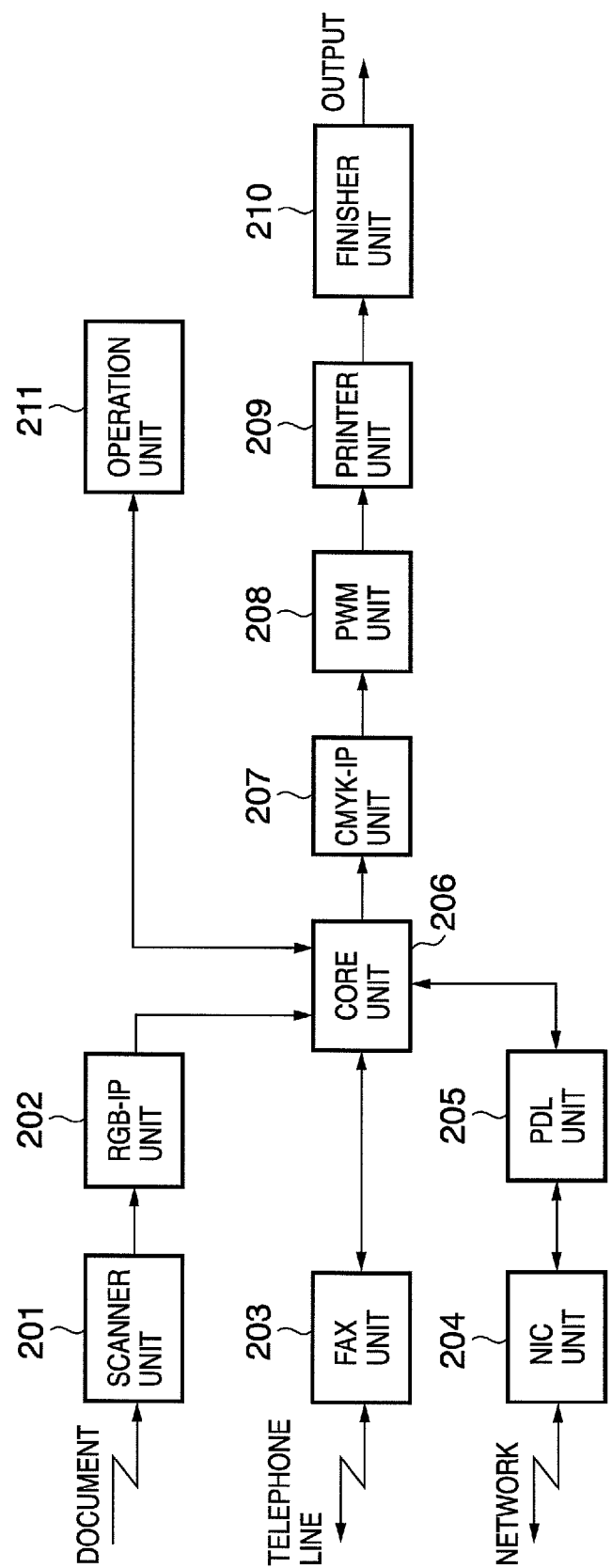
FIG. 2 is a block diagram of an overall image forming apparatus.

FIG. 2 is an overall block diagram. A scanner unit 201 scans an image, and an RGB-IP unit 202 processes image data input from the scanner unit 201. A facsimile unit 203 transmits/receives an image using a telephone line typified by a facsimile line. A NIC (Network Interface Card) unit 204 exchanges image data and apparatus information using a network. A PDL unit 205 is a print-image generation unit which rasterizes a page description language (PDL) sent from the computer into an image signal. A core unit 206 temporarily saves image data and determines the image data path in accordance with the use of the MFP 104. For example, when the core unit 206 receives image data (page data) of each page saved in the RAM of the PDL unit 205 (to be described later), it temporarily saves the data and transfers it to a subsequent CMYK-IP unit 207. Image data input to the core unit 206 desirably has a specific common format regardless of which of the RGB-IP unit 202, facsimile unit 203, and PDL unit 205 outputs the image data. In the first embodiment, the PDL unit 205 converts PDL data into data of the specific format. Data of the specific format is, e.g., uncompressed dot data.

Image data output from the core unit 206 are converted into C, M, Y, and K data via the CMYK-IP unit 207. The C, M, Y, and K data are sent to a PWM unit 208 to generate a PWM signal whose pulse width is modulated in accordance with the density of each pixel on each color plane. The PWM signal enters a printer unit 209 which forms an image. The printer unit 209 receives, e.g., a PWM signal to form an image on a sheet by well-known electrophotography. The sheet bearing the image is conveyed to a finisher unit 210, undergoes an output finishing process such as stapling or bookbinding, and is discharged outside the MFP 104.

An operation unit 211 comprises, e.g., a touch panel and buttons. With the operation unit 211, the MFP 104 can display the following user interfaces (UIs) for an operation by the operator.

(1) Function selection UI: a UI capable of selecting the functions of a copying machine, facsimile machine, and the like.

(2) UI for various settings: a UI capable of designating various settings such as the paper size and image process.

(3) Operational state UI: a UI which displays the current operational status.

(4) Login/logout UI: a UI for authenticating the right to use when the user is to use the MFP 104, and ending the use.

(5) Destination data registration/correction UI: a UI so called an address book which maintains facsimile numbers and e-mail addresses.

<Arrangement of NIC Unit 204>

Figure 3:
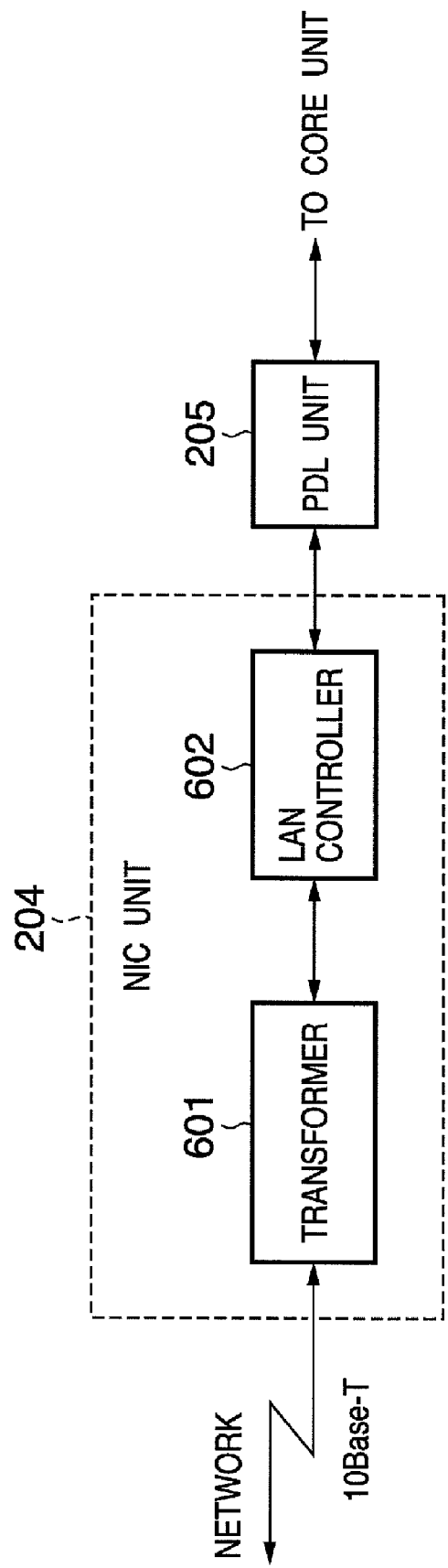
FIG. 3 is a block diagram of the NIC/print-image generation unit of the image forming apparatus.

The NIC unit 204 will be described with reference to FIG. 3. The NIC unit 204 has an interface function to the network 101. The NIC unit 204 transmits/receives a signal using an Ethernet® cable such as 10Base-T/100Base-TX, acquires external information, and supplies information outside. When externally acquiring (receiving) information, a transformer 601 converts the voltage of an electrical signal received from the network, sending the converted signal to a LAN controller 602. The LAN controller 602 incorporates the first buffer memory (not shown), demodulates an input signal, and saves information contained in the signal in the first buffer memory. If the LAN controller 602 determines that the information is necessary, it transmits the information to the PDL unit (print-image generation unit) 205 via the second buffer memory. The information is necessary when, for example, received information is a packet addressed to the image forming apparatus.

When providing (transmitting) information outside the MFP 104, the LAN controller 602 adds necessary information such as an Ethernet® frame to information sent from the PDL unit 205, and transmits the resultant information to the network via the transformer 601.

<Example of Structure of Print Data>

Print data transmitted from the computer 102 to the MFP 104 in the first embodiment is made up of five types of data: image object data, graphic object data, text object data, a control command, and frame structure data. The respective data are sent as independent data from the host computer to the MFP 104.

The first embodiment will describe three types of objects as described above, but the type of object is not limited to them. Each object may be subdivided, or an object having a different feature may be added.

The feature of each object will be explained. An image object is image data typified by a photograph, and the data is generally compressed by a compression algorithm such as JPEG. The image object is a set of pixel data, and has a simple data structure and a large data size. A text object is a set of character code data. A character code, font designation, decoration designation information, and the like are input. The text object has simple process contents, but generates a large amount of output data in comparison with input data. Graphic data is a set of vector information (e.g., outline information of a straight line, curve, rectangle, circle, or polygon), color information of the outline and inside, solid pattern information, and the like. The graphic data has input information more complicated than the image object and text object, and requires a complicated process using many process algorithms.

The control command is used to control not an object accompanying concrete data generation, but data in the image forming apparatus. More specifically, the control command contains a command to switch the function of a rasterization unit (to be described later). In addition, the control command contains a synchronous control command to synchronize objects in rasterizing them, a command to do nothing, and a command to stop the operation for a predetermined time.

Frame structure data is necessary to reproduce the structure of a print page together with each object. The frame structure data contains information such as the position of each object data on a sheet, and overlapping of objects. Specific data may be contained in an object or frame structure data.

Figure 9:
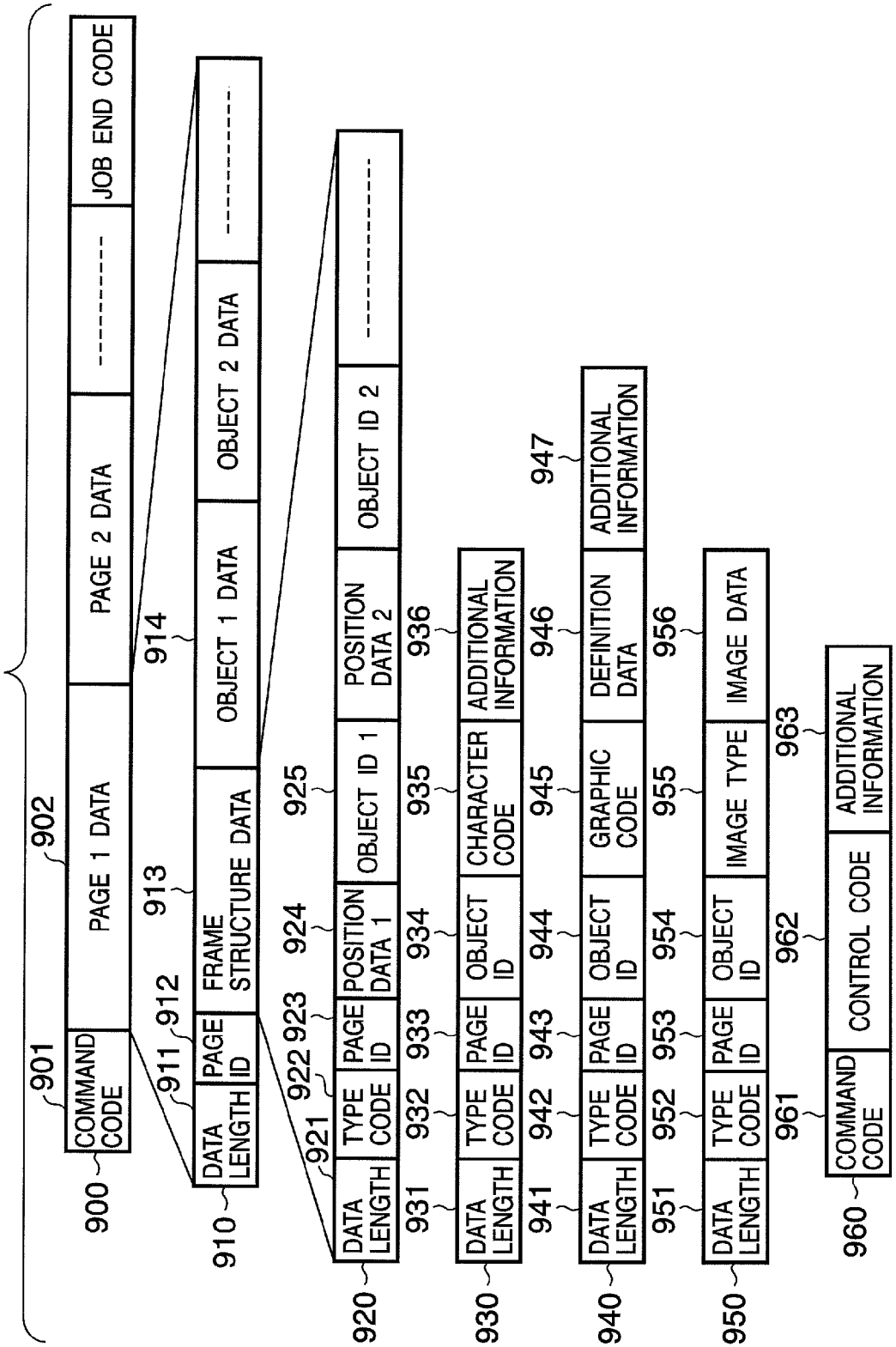
FIG. 9 is a view showing an example of print data.

FIG. 9 shows an example of print data. Object data are successive in FIG. 9, but are independently processible. Print data 900 contains a command code 901 representing the header of a print job. Page print data 902 of each page follows the command code 901. The presence/absence of a job end code is arbitrary.

Reference numeral 910 denotes details of the page print data 902. The page print data 910 contains a data length 911, a page ID 912 unique to at least a job, frame structure data 913, and object data 914 corresponding to various objects. In the first embodiment, a plurality of object data belonging to different pages may be parallel-rendered, and the page ID is desirably prepared by adding a page number or the like unique to a job to a job ID. The frame structure data 913 specifies the ID and position of an object belonging to a page containing the data. Object data defines an object belonging to a page, and is so defined as to be converted into bitmap data or the like. Object data repetitively appear by the number of objects contained in a page.

Reference numeral 920 denotes details of the frame structure data 913. The frame structure data 920 contains a data length 921, a type code 922 representing frame structure data, a corresponding page ID 923, position data 924, and an object ID 925 of an object at a position represented by the position data 924. Pairs of the position data 924 and object IDs 925 repetitively appear by the number of objects contained in a page. For example, a reference position is defined for each object, and the object position can be represented on the basis of the reference position in a page. The type code 922 is a predetermined code representing the type of object, but may be the address of one of rasterization units 702 to 704 in FIG. 4. That is, the address of a rasterization unit which rasterizes a target object serves as the type code. A plurality of rasterization units are sometimes called a rasterization unit or data rasterization unit at once. In this case, each rasterization unit is also called an object conversion unit to discriminate it from the whole data rasterization unit.

The first embodiment supports three types of object data. Text object data 930 contains a data length 931, a type code 932 representing text object data, a page ID 933 to which an object belongs, and a unique object ID 934 in a page. These data are common to another type of object data. As data unique to text object data, the text object data 930 contains a character code 935, and additional information 936 containing the font, color, decoration information (e.g., italic or bold), and the like. A text object may be defined for each character, but a character string containing common additional information may be defined.

Graphic object data 940 contains a graphic type code 945, graphic definition data 946, and additional information 947 such as color and solid designation, in addition to data common to each object. The graphic type code 945 represents a graphic type such as a circle, rectangle, straight line, or vector. The definition data 946 represents a parameter for specifying a graphic of a designated graphic type. For example, the definition data 946 describes the coordinates of the center point and the radius when the type is the circle, and the coordinates of corners when the type is the rectangle.

Image object data 950 contains an image type code 955 and image data 956 in addition to data common to each object. The image type code 955 represents the compression method, parameter, and the like. The image data 956 is the entity of data so compressed as designated by the image type code 955. The image data 956 may not be compressed.

The above-described data form a print job. The computer 102 can transmit a control command to the MFP 104 to control it at a remote site. A function switching command 960 to the rasterization unit is one control command. The function switching command 960 contains a command code 961 representing the function switching command, a control code 962, and additional information 963. The control code contains information for specifying a rasterization unit whose function is to be switched, and information representing a function after switching. Control commands such as the function switching command 960 may be embedded in a print job. The order of data input to respective blocks in the PDL unit 205 of the image forming apparatus complies with an order (e.g., transmission order) contained in a print job. If the print job contains the function switching command 960, the function of the switching target rasterization unit changes before and after the process of the function switching command 960. A designated rasterization unit can process an object before and after function switching by describing the address of the rasterization unit in the type code of object data. This is because, when giving attention to one rasterization unit, the order of object data input to it complies with an order contained in a print job. For example, the printer driver can uniquely designate the object order by setting the order of objects contained in one page to the order of object ID values, and setting the order of objects contained in different pages to the order of page ID values.

<Arrangement of PDL Unit 205>

Figure 4:
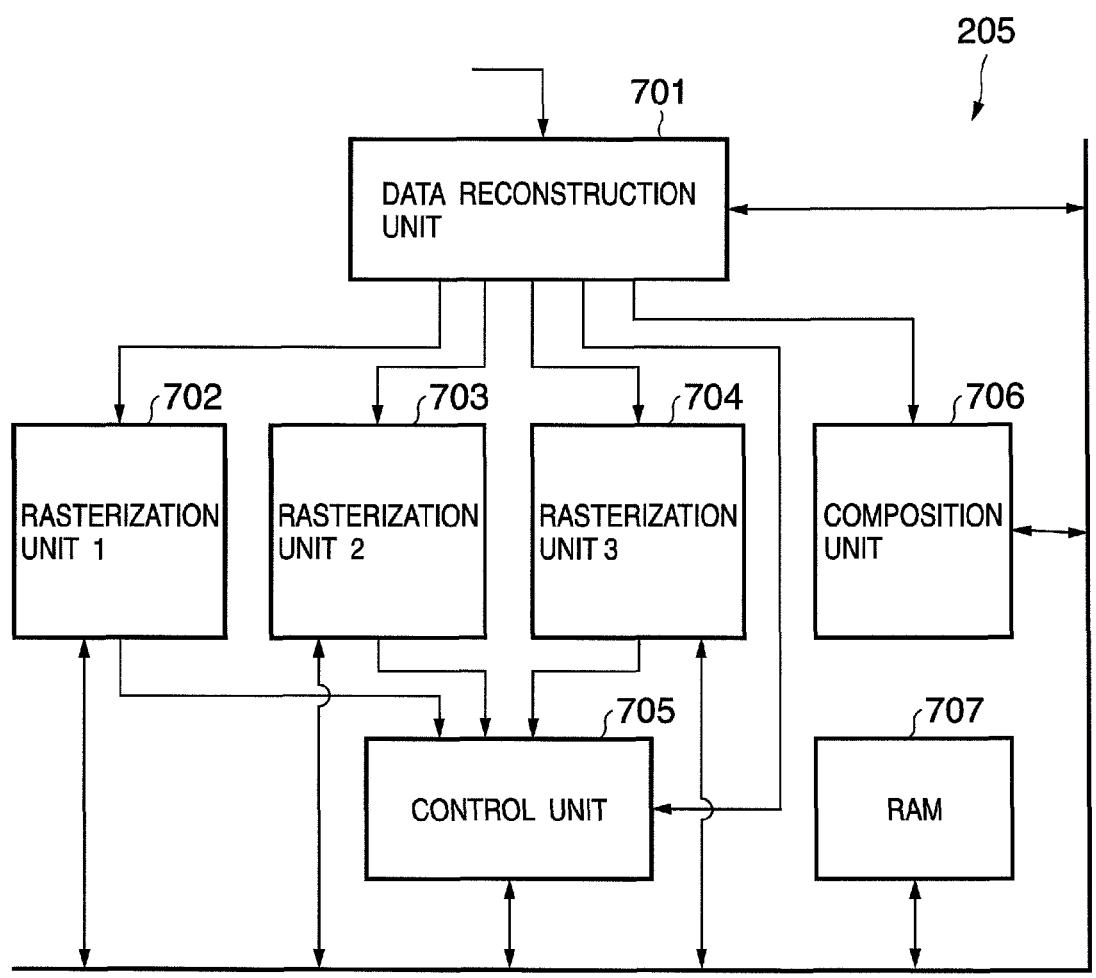
FIG. 4 is a block diagram of the PDL unit (print-image generation unit) of the image forming apparatus.

Details of the PDL unit 205 will be explained with reference to FIG. 4. The PDL unit 205 generates bitmap data on the basis of print data as shown in FIG. 9 sent from the computer 102. A RAM 707 temporarily saves print data sent from the NIC unit 204.

A data reconstruction unit 701 reconstructs data stored in the RAM 707 into data of each segment of object data. The data reconstruction unit 701 determines which of the rasterization unit 1 702, the rasterization unit 2 703, the rasterization unit 3 704, a composition unit 705, and a control unit 706 is to process target object data. The determination is based on the type code (e.g., address) added to each data. The data reconstruction unit 701 transfers the target object data to the determined unit. Rasterization units 1 to 3 convert received object data into a specific format processible by a subsequent unit such as the CMYK-IP unit. In the first embodiment, the specific format is the bitmap format. Each rasterization unit can efficiently rasterize each object in accordance with its feature. In the first embodiment, the rasterization unit 1 702 is optimal for rasterizing image data object, and is formed from dedicated fixed hardware so as to execute a simple process at high speed. The rasterization unit 1 702 may take a configuration capable of executing a simple process at high speed while it is programmable similarly to the digital signal processor (DSP). The rasterization unit 2 703 can rasterize text data and is formed from hardware optimal for generating text data. In order to smoothly output a large amount of data, the rasterization unit 2 703 comprises a large-capacity output buffer. However, the internal configuration is not particularly limited to this. The rasterization unit 3 704 is formed from a high-speed CPU (not shown) optimal for rasterizing graphic data, a large-capacity ROM (not shown) which stores many programs so as to execute many process algorithms, and a work RAM (not shown). The rasterization unit 3 704 may be formed from dedicated hardware which implements an algorithm optimal for bitmapping graphic data. Unique address information for designating a data transfer destination is assigned to each rasterization unit, and the data reconstruction unit transfers data on the basis of the address information.

The data reconstruction unit 701 transfers a control command to the control unit 706, and transfers frame structure data to the composition unit 705. The frame structure data is saved in the RAM 707 and can be referred to by any unit by sharing the address.

Each rasterization unit generally provides various functions, and in the first embodiment, can change its hardware function. When the numbers of objects of respective types are unbalanced, the rasterization unit can switch its function in accordance with a command from the host. For example, to print data formed from only text data and graphic data without containing any image, the function of rasterization unit 1 switches from an original image data object process to, e.g., a graphic object process in accordance with a command from the host. To switch the function, according to the first embodiment, each rasterization unit comprises hardware suited to rasterize various objects, and the input and output paths of object data switch to hardware suitable for a selected function. Upon reception of a command (function switching command) from the host computer, the control unit 706 executes switching. As another embodiment, switching is also implementable using a programmable device such as an FPGA. In this case, the program may be stored in advance in the storage unit of the image forming apparatus, or stored in the host computer and transmitted before use. For example, a program is attached as additional information to a function switching command, and loaded into the rasterization unit to switch the function.

The RAM 707 stores a bitmap image rasterized in each rasterization unit. The composition unit 705 composites bitmap images for each page to which objects belong, generating page data. In composition, the composition unit 705 generates an original image (i.e., page data) to be formed on a sheet while determining the layout and overlapping of object data converted into bitmap images. The RAM 707 stores the generated page data of C, M, Y, and K color components. Unique address information for designating a data transfer destination is assigned to the composition unit 705, similar to the rasterization unit. The data reconstruction unit transfers frame structure data on the basis of the address information.

The control unit 706 controls the whole operation of the PDL unit (print-image generation unit). As an arrangement other than that of the first embodiment, the control unit 706 may also function as the CPU incorporated in the rasterization unit 3 704. Unique address information for designating a data transfer destination is assigned to the control unit 706, similar to the rasterization unit. The data reconstruction unit transfers a control command on the basis of the address information.

The RAM 707 is connected to another unit via a bus (not shown), and can exchange data with the unit. The RAM 707 stores object data, rasterized bitmap data, and composited print image data (page data). The RAM 707 is also used as a work area. The control unit 706 manages the storage area of the RAM 707. When each unit wants to use the RAM 707, it can calculate in advance a capacity to be allocated and ask the control unit 706. Alternatively, a fixed area may be allocated in advance. If the remaining blank area runs short to a predetermined capacity or less before completing a 1-page area in the RAM 707 managed in this manner, bitmap data of rasterized object data of the next page is discarded to free the area where the bitmap data is stored. Similarly, if the remaining blank area runs short to a predetermined capacity or less, no object of the next page is rasterized into bitmap data. The host computer is notified of this situation. Object data conversion process procedures by the PDL unit 205 will be described with reference to FIG. 11 and the like.

<Arrangement of Core Unit 206>

Figure 5:
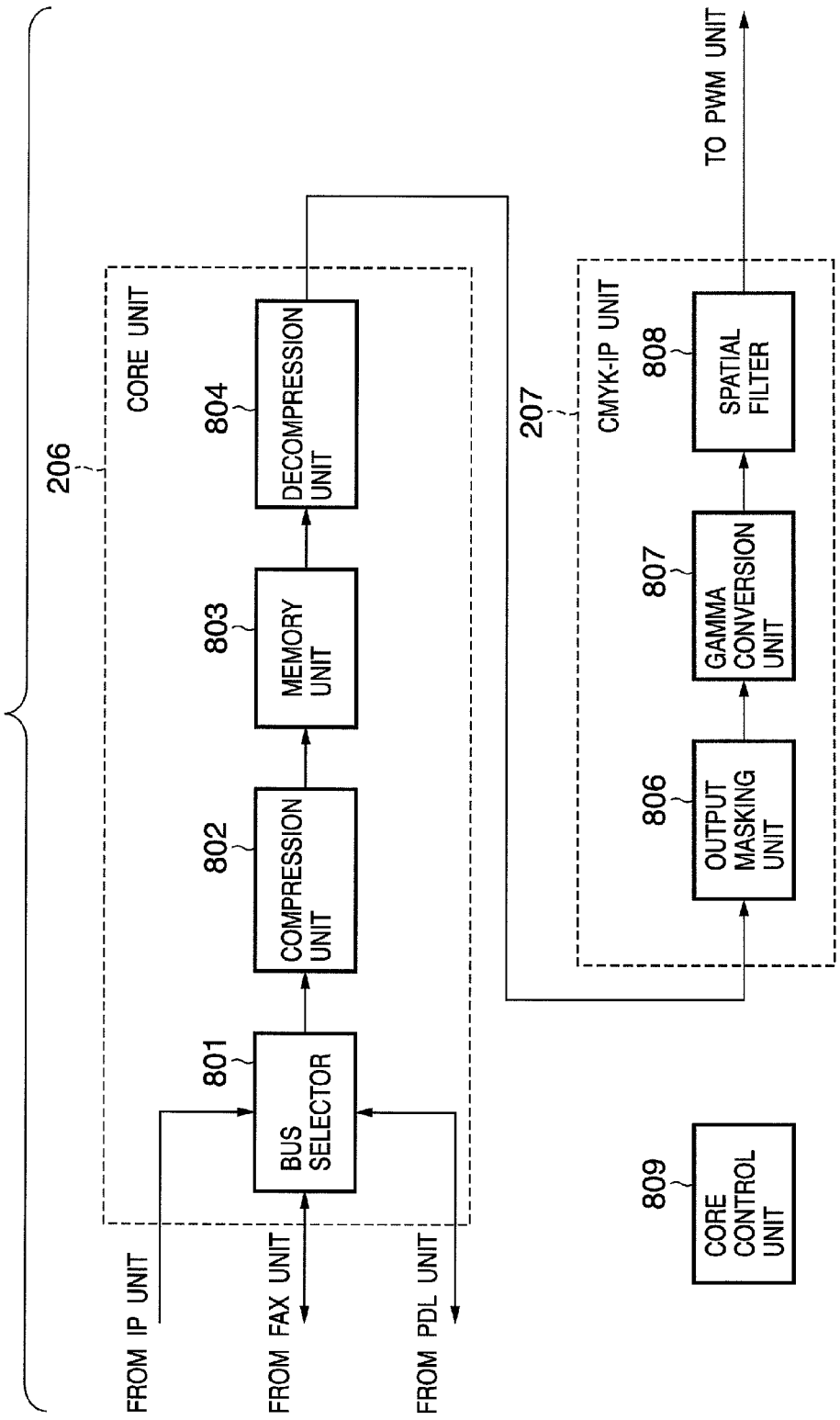
FIG. 5 is a block diagram of the core unit/CMYK-IP unit of the image forming apparatus.
Figure 6:
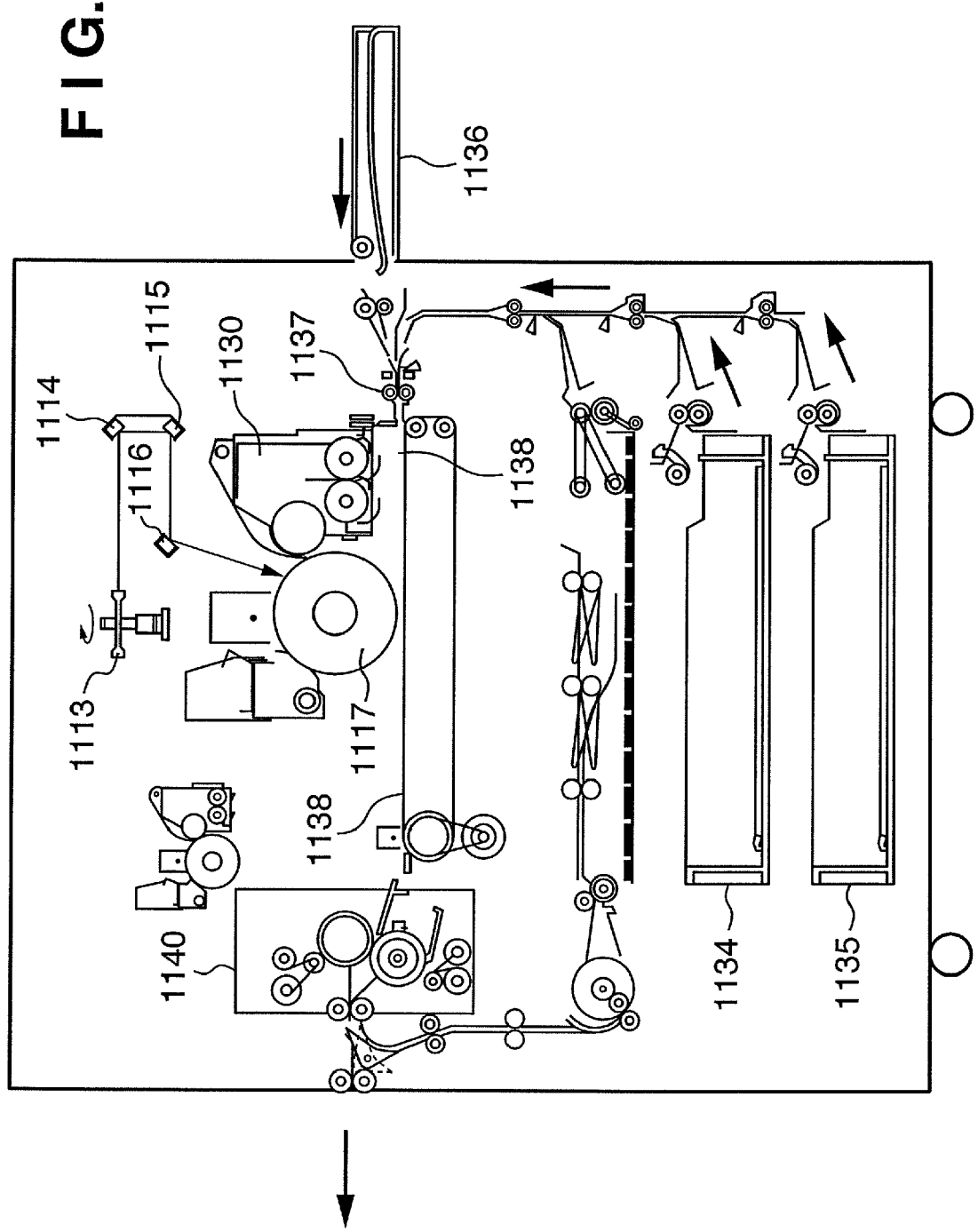
FIG. 6 is a schematic view of the printer unit of a monochrome image forming apparatus.

The core unit 206 will be described with reference to FIG. 5. A bus selector unit 801 of the core unit 206 executes so-called information traffic control in the use of the MFP 104. More specifically, the core unit 206 switches the bus in accordance with a stand-alone copying function, network scanning, network printing, facsimile transmission/reception, or various functions of the MFP 104. The following path switching is conceivable:

stand-alone copying function: scanner 201→core 206→printer 209.

network scanning: scanner 201→core 206→NIC unit 204.

network printing: NIC unit 204→core 206→printer 209.

facsimile transmission function: scanner 201→core 206→FAX unit 203.

facsimile reception function: FAX unit 203→core 206→printer 209.

Image data output from the bus selector unit 801 is compressed and coded by a compression unit 802, and temporarily stored in a memory unit 803 formed from a large-capacity memory such as a hard disk (HDD). Image data read out from the memory unit 803 is decompressed and decoded by a decompression unit 804 and sent to the printer unit 209. A scaling unit may be arranged to enlarge/reduce image data, which is adopted when transferring a reduced image to another apparatus. The compression method used is a general one such as JPEG, JBIG, or ZIP.

A core control unit 809 controls the overall core unit 206 using a control signal (not shown). This control includes bus switching control by the bus selector 801, and interfacing with a device (e.g., operation unit) other than the core. Interfacing can notify the core of the operational states of other units.

<Arrangement of CMYK-IP Unit 207>

The CMYK-IP unit 207 will be explained with reference to FIG. 5. An output masking/UCR circuit unit 806 receives data transferred from the core unit 206, obtains C1, M1, and Y1 signals by LOG transformation, and converts them into Y, M, C, and K signals serving as toner colors of the image forming apparatus by matrix operation. More specifically, the output masking/UCR circuit unit 806 corrects C1, M1, Y1, and K1 signals based on R, G, and B signals read by a CCD sensor 308 into C, M, Y, and K signals based on the spectral distribution characteristic of toner, and outputs the C, M, Y, and K signals.

With a lookup table (LUT) considering the tint characteristic of toner, a gamma conversion unit 807 gamma-converts image data into C, M, Y, and K data for outputting an image. A spatial filter 808 sharpens or smoothes image data. The image data is sent to the PWM unit 208 to form an image on a sheet. Whether the image is monochrome or color is determined from the balance between the C, M, Y, and K signals.

<Arrangement of Printer Unit 209 (for Color MFP 104)>

The printer unit of the MFP 104 is of a so-called tandem type having a developing unit for each color. The printer unit 209 comprises four semiconductor lasers corresponding to C, M, Y, and K colors, and polygon mirrors for reflecting four laser beams. Each laser beam scans a photosensitive drum for each color via an optical system such as a reflecting mirror. An electrostatic latent image is formed on each photosensitive drum by a laser operation modulated by PWM-modulated image data. The electrostatic latent image is developed with toner of a color corresponding to each photosensitive drum.

A sheet is supplied from one of sheet cassettes or a manual feed tray, and chucked and conveyed by a transfer belt via registration rollers. Toner of each color is applied to the photosensitive drum for the color in synchronism with the paper feed timing. As the sheet is conveyed, a toner image of each color is transferred onto the sheet, obtaining a full-color output image. The sheet bearing toner of each color is separated from the transfer belt, conveyed to a fixing unit where the toner is fixed onto the sheet, and then discharged outside the apparatus.

The four photosensitive drums are arranged at equal intervals of the distance d, and the convey belt conveys a sheet at a predetermined speed v. The four semiconductor lasers are driven in synchronism with their timings.

<Arrangement of Printer Unit 209 (for Monochrome MFP 105)>

Figure 11:
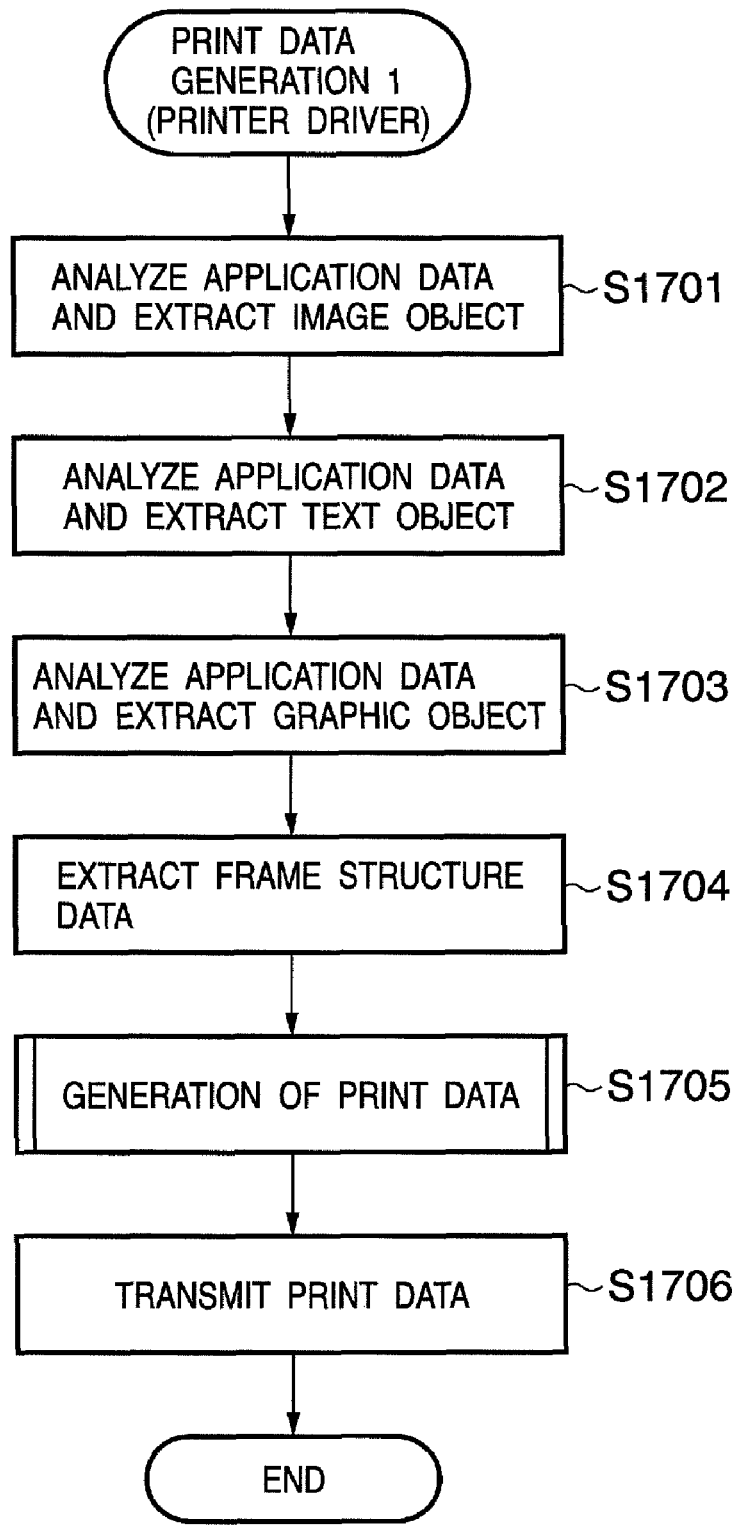
FIG. 11 is a flowchart showing an outline of an operation by a printer driver in the first embodiment.

FIG. 11 is a schematic view showing the appearance of the monochrome printer unit. A polygon mirror 1113 receives a laser beam emitted from a semiconductor laser. The laser beam scans a photosensitive drum 1117 via mirrors 1114, 1115, and 1116. A developing unit 1130 which supplies black toner develops a latent image on the photosensitive drum. The developed toner image is transferred onto a sheet, obtaining an output image.

A sheet fed from one of sheet cassettes 1134 and 1135 and a manual feed tray 1136 is chucked and conveyed on a transfer belt 1138 via registration rollers 1137. The photosensitive drum 1117 is operated in synchronism with the paper feed timing to form a toner image. As the sheet is conveyed, toner is transferred onto the sheet. The toner-transferred sheet is separated, a fixing unit 1140 fixes the toner onto the sheet, and the sheet is discharged similarly to a color image.

<Network 101>

Figure 7:
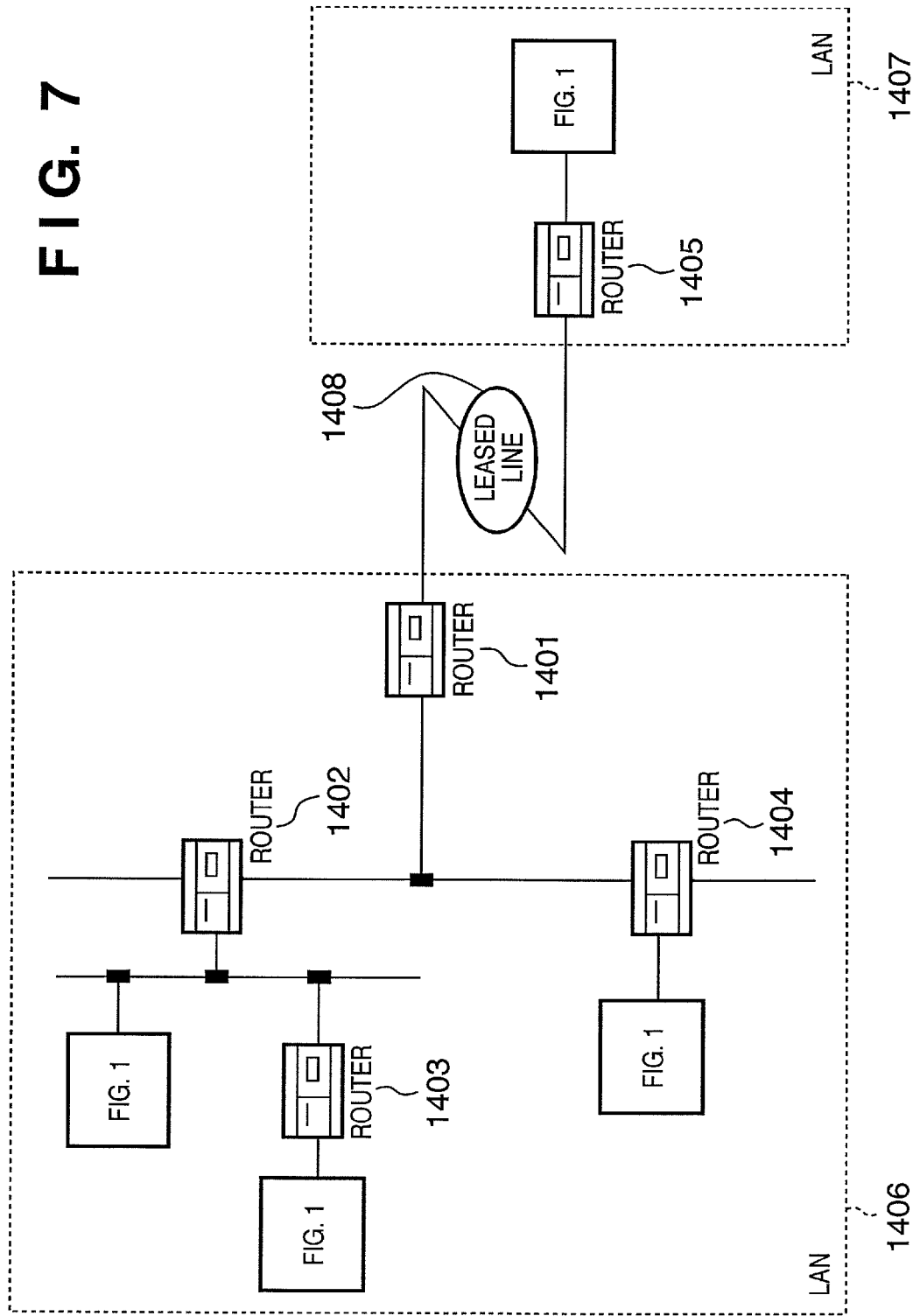
FIG. 7 is a schematic view of a network environment.

The network 101 will be described. As shown in FIG. 7, the network 101 forms another network called a LAN (Local Area Network) by connecting a configuration as shown in FIG. 1 to a router for connecting networks. A LAN 1406 is connected via an internal router 1401 and leased line 1408 to a router 1405 in another LAN 1407. Such networks are connected to build a wide connection form.

Figure 8:
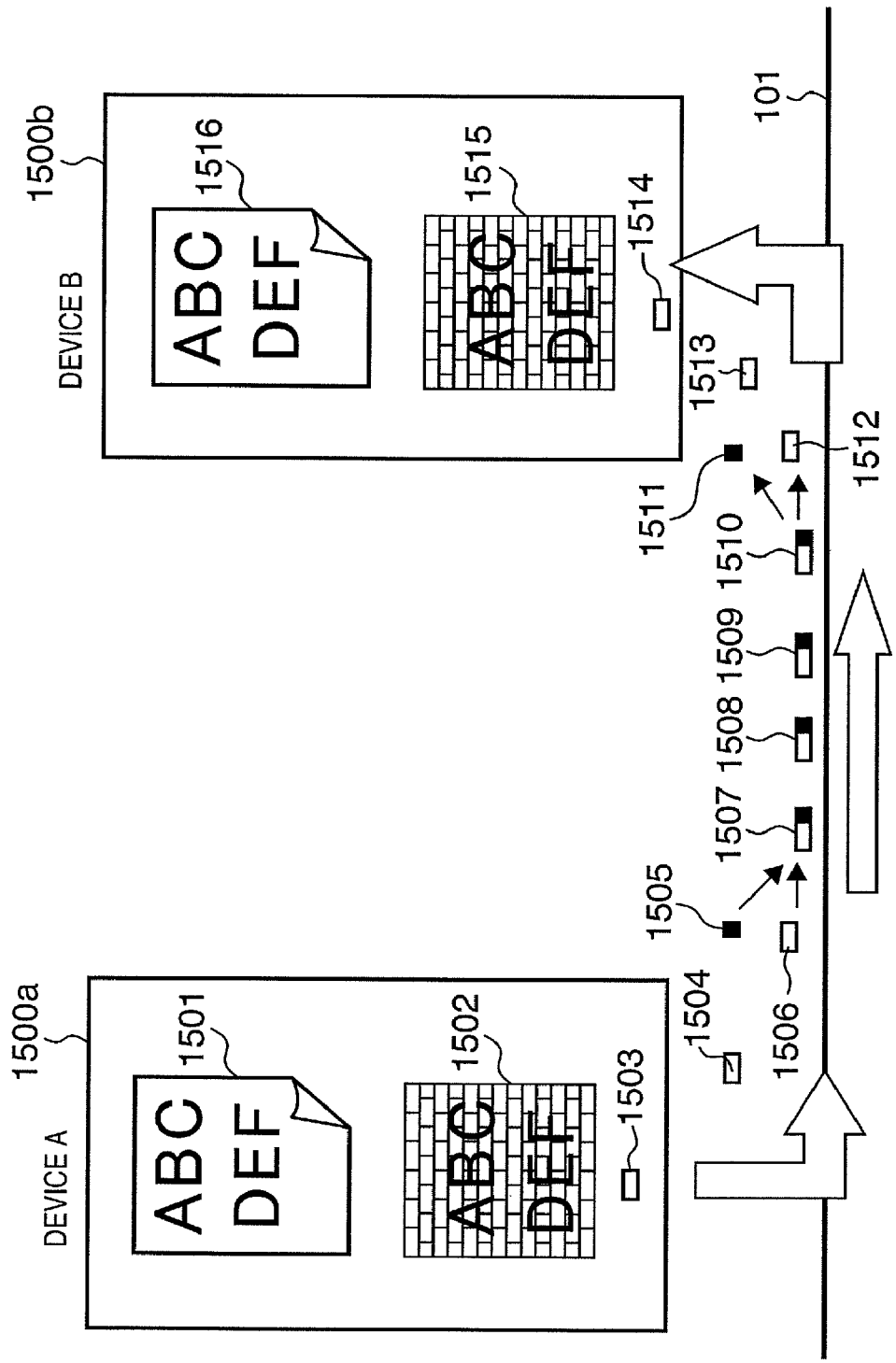
FIG. 8 is a schematic view of data transfer via the network.

Data flowing through the network will be explained with reference to FIG. 8. Data 1501 exists in a transmitting device A 1500*a*. The data 1501 may be image data, print data, or a program. When transferring the data 1501 to a receiving device B 1500*b* via the network 101, the transmitting device A 1500*a* divides the data 1501 into image data 1502. A destination address called a header 1505 is added to divided data 1503, 1504, and 1506, and the resultant data are sequentially sent as packets 1507 to the network 101. In the use of the TCP/IP protocol, the destination address is the IP address of the destination. If the address of device B and a header 1511 of a packet 1510 coincide with each other, data 1512 is separated from the header 1511 and input as data 1513 and 1514 to device B. Device B reconstructs divided data 1515 into data 1516 identical to the data in device A.

<Printer Driver>

Figure 10:
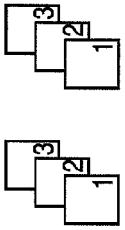
FIG. 10 is a view showing the display window of a driver.

A process to transmit image data to a printer from a printer driver running on the computer 102 will be described with reference to FIG. 10. The printer driver provides a GUI for designating a print operation. The user can input desired setting parameters on the GUI and send a desired image to a destination such as a printer. In FIG. 10, a window 1601 of the printer driver displays a destination selection column 1602, page setup column 1603, copy count setup column 1604, property key 1607, and finishing setting 1608 as setup items.

The destination selection column 1602 is used to select a target output destination. The output destination is generally an output device such as the MFP 104 or 105 or the printer 107, but an image may be transferred to the memory device 108 in order to save the image. The page setup column 1603 is used to select an output page from a job, and designates which page of an image generated by application software running on the computer 102 is to be output. The copy count setup column 1604 designates the number of copies. The property key 1607 is used to make detailed settings for a destination device selected in the destination selection column 1602. By clicking the property key 1607, the user can input device-specific setting information in another window and change the parameters of a special image process, e.g., the gamma conversion unit 807 and spatial filter 808 in the CMYK-IP unit 207. Finer color reproduction and sharpness adjustment become possible by changing settings. The finishing setting 1608 shows different setup items in accordance with a selected printer.

When the user clicks the right of the destination selection column 1602, a list of available printers, MFPs, and the like appears. For this purpose, printers on the network must be searched for. The search for MFPs and printers on the network utilizes a directory service. An example of the directory system using the directory service is LDAP (Lightweight Directory Access Protocol). The LDAP definition is described in standard specifications "RFC (Request For Comments) 1777" issued by IETF (Internet Engineering Task Force). A list of the network addresses of apparatuses available on the network can be obtained by searching for apparatuses connected to the network using the directory service. The computer 102 on the network 101 functions as an LDAP server, and saves all pieces of information on apparatuses on the network. The computer can search for a desired apparatus by inquiring apparatuses on the network of the LDAP server without searching them for by itself. An apparatus close to the computer, or a printer which is closest to a desired printer and has a desired function is also searchable by registering position information of apparatuses in accordance with information such as their equipment information and states. The position information defines, for example, X and Y distances from a reference point on each floor, and floor information or the like is also added. For example, the position information is expressed by attaching information such as 3X5Y2 when the distance is 3 m (or a distance to the third pillar) in the X direction and 5 m in the Y direction from the reference corner on the second floor. The driver inquires apparatuses on the network of the LDAP server, and can display a list of printers in the destination selection column 1602. After making desired settings, the user starts printing with an OK key 1605. The user cancels printing with a cancel key 1606.

<Outline of Process by Printer Driver>

The printer driver according to the first embodiment can acquire information representing a hardware configuration from an image forming apparatus. The printer driver generates print data of a structure in which five types of data, i.e., image object data, graphic object data, text object data, a control command, and frame structure data are independent of each other. The printer driver transmits the print data to the image forming apparatus. The independent structure allows separating respective data. Each data has address information representing which of hardware blocks (rasterization units 1 to 3, composition unit, and control unit) in the image forming apparatus is to receive and process the data.

When the predicted rasterization times of objects are greatly different from each other, some objects are converted into other objects to make the predicted rasterization times coincide with each other. For example, when the rasterization time of graphic objects is predicted to be long, some graphic objects are converted into image data, which are embedded in print data. At this time, attribute data representing that the object data are originally graphic data is added. If the image forming apparatus determines that the object data is an image object, it generally performs a unique image process. In this case, the attribute data can prevent any unexpected result. The image forming apparatus checks the attribute, and when the object data is originally another object, it does not execute any image process. This conversion is done, e.g., every page.

The printer driver can acquire information on the process status of each rasterization unit from the image forming apparatus. If the loads of actual processes on respective rasterization units are different on the basis of the acquired information, the printer driver suspends transfer of the object. The printer driver calculates the predicted rasterization times of the remaining objects again, and if they are different, converts some objects having a long predicted rasterization time into other object data, and embeds the object data in print data, similar to the above-mentioned case. Also at this time, attribute data representing that the object data are originally graphic data is added.

Since the hardware function is changeable in the first embodiment, the function of the rasterization unit is switched in accordance with a command from the host computer when the predicted rasterization times of objects are different from each other. For example, to print data formed from only text data and image data without containing any graphic, the function of rasterization unit 3 is switched to perform not an original graphic object process but, for example, an image object process. Switching complies with a command (function switching command) from the host. If no specific object exists, the printer driver embeds, in print data, a command to switch the function of a rasterization unit corresponding to rasterization of the object. If the printer driver determines that the predicted rasterization time of specific object data is short (i.e., the load is light) and the process becomes faster by changing the function of a given rasterization unit, the printer driver uses the rasterization unit by switching its function, as described above. If given object data cannot be rasterized after switching the function of the rasterization unit, the object data is converted into rasterizable one. For example, if the printer driver predicts that the rasterization load of graphic objects is light, existing graphic objects are converted into image data, which are embedded in print data. At this time, attribute data representing that the object data are originally graphic data is added.

In this way, the printer driver can acquire information on the process status of each rasterization unit from the image forming apparatus. If the loads of actual processes on respective rasterization units vary widely, the printer driver uses the rasterization units by switching their functions, as described above. Moreover, the printer driver calculates the predicted rasterization times of the remaining objects again. If the predicted rasterization times of processes on respective rasterization units vary widely, the printer driver converts some objects having a long predicted rasterization time into other object data, and embeds the object data in print data. Also at this time, attribute data representing that the object data are originally graphic data is added.

When a programmable device such as the FPGA is used to change the hardware function of the rasterization unit, the program can be stored in the host computer and transmitted before use. In this case, a command to transmit the FPGA program, and program data are transferred to the image forming apparatus in advance.

The operations of the printer driver and image forming apparatus in the image forming system having the above configuration will be explained with reference to the flowcharts of FIGS. 11 to 14, the table of FIG. 15, and FIGS. 16A to 16B.

<Process by Printer Driver>

Figure 12:
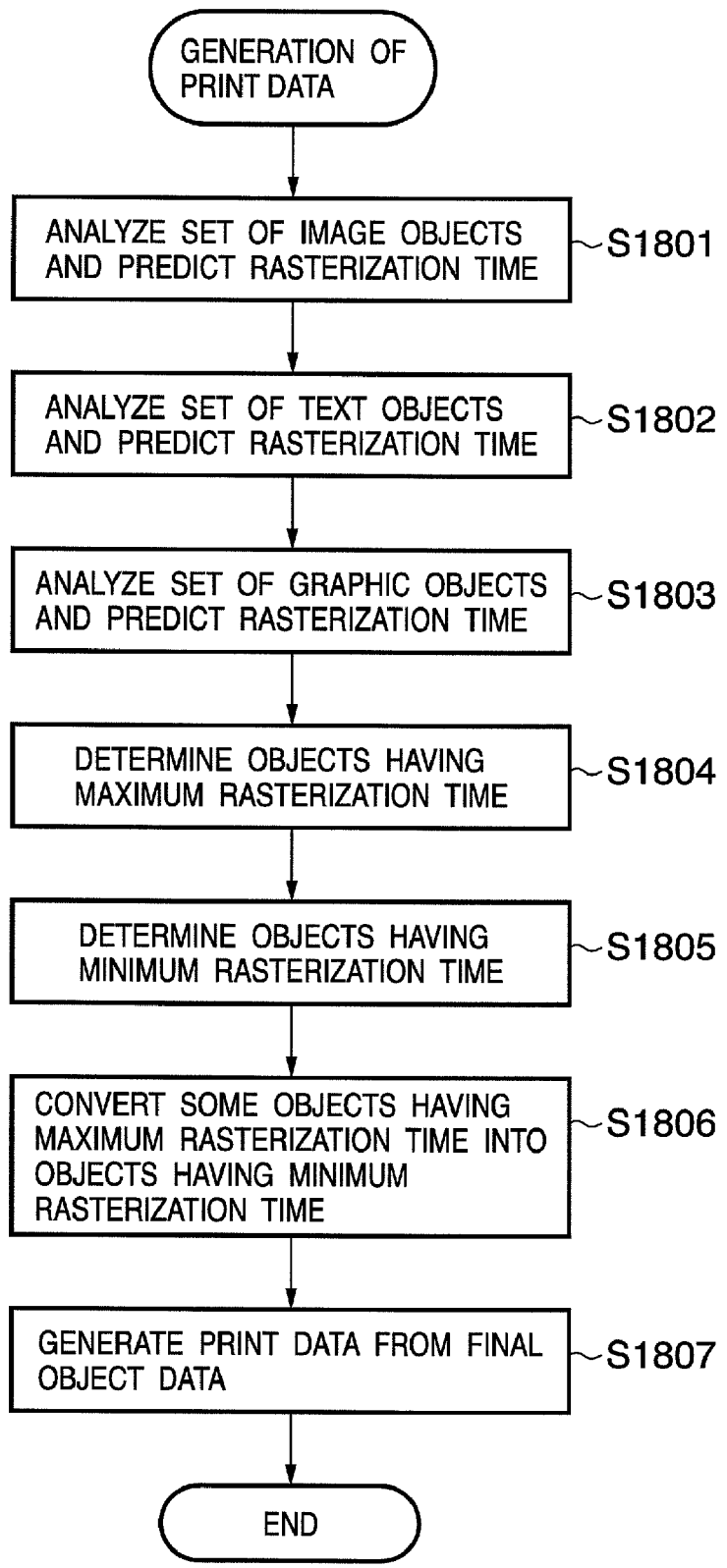
FIG. 12 is a flowchart showing an outline of an operation by the printer driver in the first embodiment.

FIGS. 11 and 12 are flowcharts for explaining the operation of the host, particularly, the printer driver. In step S1701, the printer driver analyzes application data, extracts data to be converted into image object data, and converts the extracted data into image object data. In step S1702, the printer driver analyzes the application data, extracts data to be converted into text object data, and converts the extracted data into text object data. In step S1703, the printer driver analyzes the application data, extracts data to be converted into graphic object data, and converts the extracted data into graphic object data. In step S1704, the printer driver analyzes the application data, and extracts a frame structure such as the layout and overlapping of objects to generate frame structure data. In step S1705, the printer driver generates, from these data, print data to be transmitted to the image forming apparatus. The processes in steps S1701 to S1706 are executed for each page, and repeated by the number of pages for application data of pages. If application data does not have any page break, the printer driver divides the application data into pages by the output size, and then executes the process in FIG. 11 for each page.

Generation of print data in step S1705 of FIG. 11 will be described in detail with reference to FIG. 12. In step S1801, the printer driver predicts the rasterization time by analyzing image object data belonging to a page during data generation. When there are a plurality of objects, the printer driver accumulates the rasterization times of respective object data. This rasterization time is the predicted rasterization time. This also applies to another type of object. In step S1802, the printer driver predicts the rasterization time by analyzing a set of text object data belonging to the page during data generation. In step S1803, the printer driver predicts the rasterization time by analyzing a set of graphic object data belonging to the page during data generation. In step S1804, the printer driver determines an object type having the maximum predicted rasterization time. In step S1805, the printer driver determines an object type having the minimum predicted rasterization time. In step S1806, the printer driver converts some data of the object type having the maximum rasterization time into the object type having the minimum predicted rasterization time. Assume that the predicted rasterization time of text data is maximum, and that of image data is minimum. In this case, the printer driver rasterizes some text data into image data in the host computer (printer driver). In step S1807, the printer driver generates print data from the final object data.

To calculate the predicted rasterization time, calculation parameters are prepared in advance in the printer driver. The printer driver in the first embodiment corresponds to the MFP 104 having the PDL unit 205 in FIG. 4, and parameters corresponding to the performance of the PDL unit 205 can be prepared. For example, the predicted rasterization time of a text object is obtained by multiplying the number of characters, the character size, and the additional data amount of character decoration by each other as variables, and weighting the product with the performance parameter. The predicted rasterization time of a graphic object is obtained by multiplying the performance parameter of each graphic type by the number of graphic objects of each type and their size. The predicted rasterization time of an image object is obtained by multiplying a performance parameter corresponding to the compression method by the image size. These are merely simple examples.

The amount of object data whose object type is converted is determined to make predicted rasterization times as equal as possible between the object types. For example, the difference between maximum and minimum predicted rasterization times is calculated. First, attention is given to the number of objects of an object type having the maximum predicted rasterization time. Then, the number of objects is divided at a ratio of the (maximum predicted rasterization time−minimum predicted rasterization time)/2 and the minimum predicted rasterization time+(maximum predicted rasterization time−minimum predicted rasterization time)/2. Objects of the object type having the maximum predicted rasterization time are selected by the number proportional to (maximum predicted rasterization time−minimum predicted rasterization time)/2, and converted into the object type having the minimum predicted rasterization time.

It is easy to convert a text or graphic object into an image object, but it is difficult to convert an image object into a text or graphic object or convert a text/graphic object into a graphic/text object. Hence, objects may be converted only when the object type having the minimum predicted rasterization time is an image object.

<Process by Image Forming Apparatus>

Figure 13:
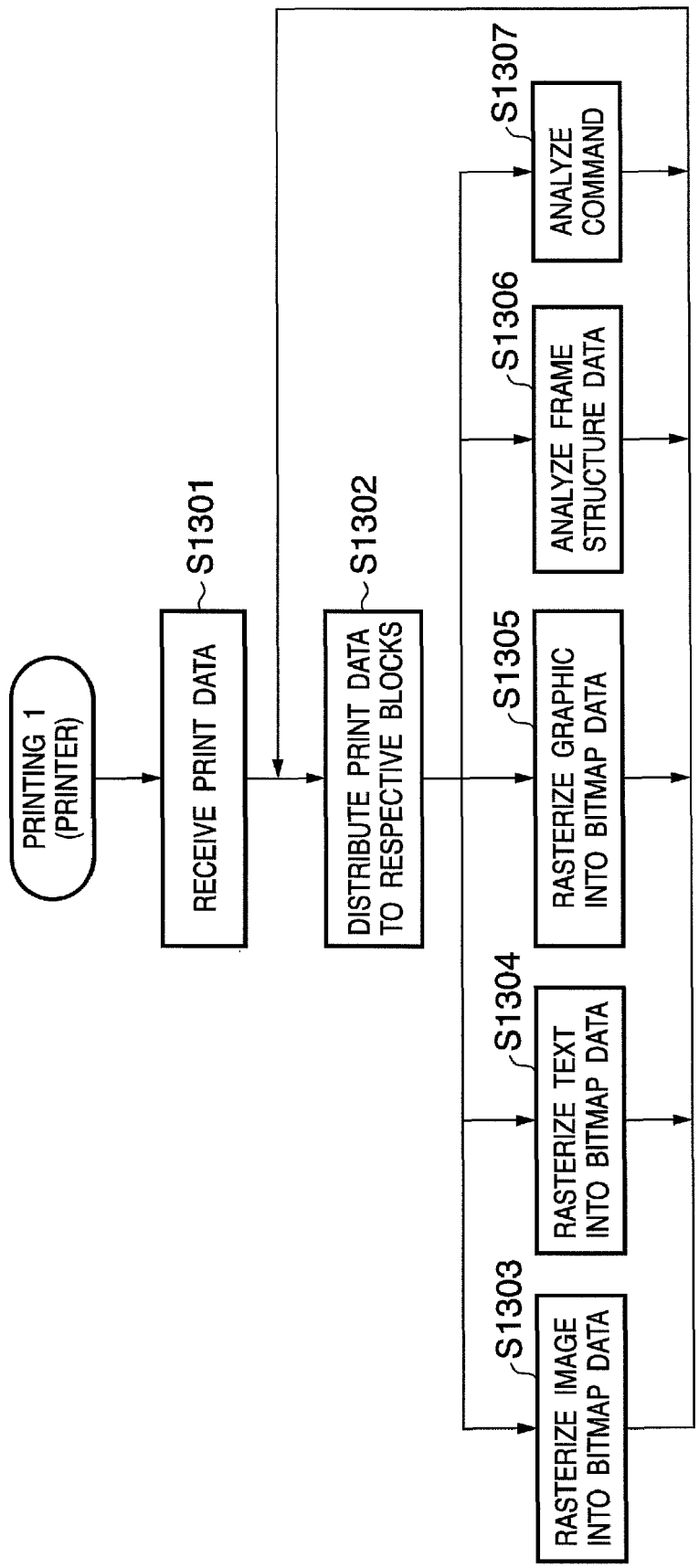
FIG. 13 is a flowchart showing an outline of an operation by a PDL unit in the first embodiment.

The operation in the image forming apparatus will be explained with reference to FIGS. 13 and 14. FIG. 13 shows a process by the data reconstruction unit 701 and rasterization units 1 to 3 until an object is converted into bitmap data. In step S1301, the data reconstruction unit 701 of the image forming apparatus receives print data from the host computer. In step S1302, the data reconstruction unit 701 analyzes the received print data to reconstruct data sets to be transferred, i.e., data sets (including frame structure data) of each object and command shown in FIG. 9. The data reconstruction unit 701 transfers the data to a hardware block corresponding to address information of a destination represented by the type code or the like. Steps S1303 to S1307 are parallel processible. Respective hardware blocks parallel-process data transferred from the data reconstruction unit 701.

In step S1303, the rasterization unit 1 702 rasterizes an image object. In step S1304, the rasterization unit 2 703 rasterizes a text object. In step S1305, the rasterization unit 3 704 rasterizes a graphic object. In step S1306, the composition unit 705 analyzes frame structure data. In step S1307, the control unit 706 analyzes command data to perform various control operations. The operation of the composition unit 705 will be described with reference to FIG. 14. Each hardware block processes object data and commands input from the data reconstruction unit 701 in the input order. In FIG. 13, the process returns from step S1307 or the like to step S1302 for descriptive convenience. In practice, however, the data reconstruction unit 701 keeps inputting data to each hardware block, and the hardware block keeps processing the input data.

Figure 14:
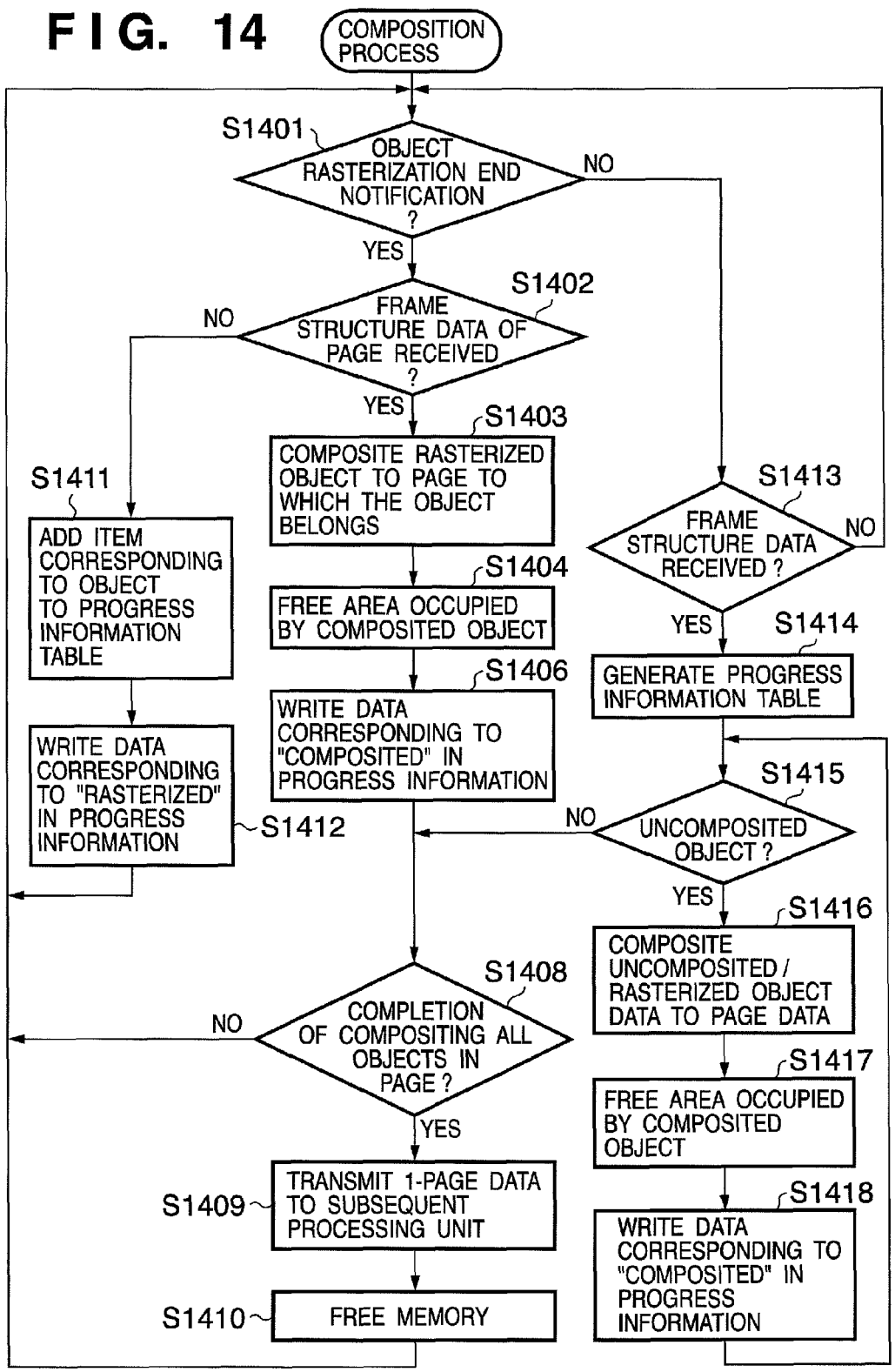
FIG. 14 is a flowchart showing an outline of an operation by a composition unit in the first embodiment.
Figure 15:
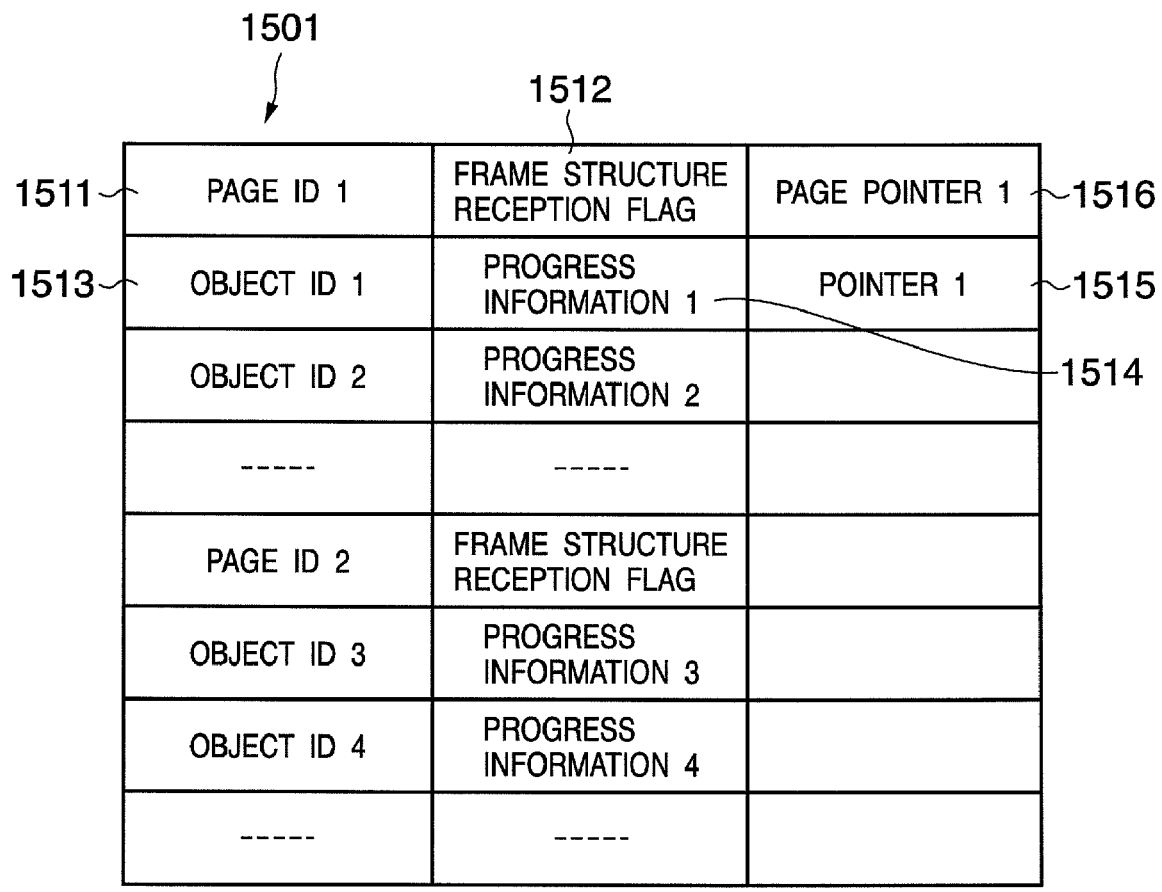
FIG. 15 is a table showing the structure of a progress information table.

FIG. 14 shows the procedures of a composition process and frame structure data process by the composition unit 705. FIGS. 15 to 17B show a lookup table. The table will be explained first. FIG. 15 is a table showing a progress information table 1501 representing the progress of page data generation. The progress information table 1501 contains a page ID 1511 of a page whose progress is given by the progress information table, a frame structure data reception flag 1512 of the page, an object ID 1513, and progress information 1514 corresponding to the object. The progress information table 1501 further contains a pointer 1515 to rasterized data, and a pointer 1516 to composited page data. Pairs of object IDs and progress information repetitively appear by the number of objects contained in a page. The frame structure data reception flag 1512 is set to "true" if frame structure data of a target page is received. The progress information takes three values "unprocessed", "rasterized", and "composited" in accordance with the process status of a target object. The initial value is "unprocessed". These values show merely their meanings, and predetermined codes corresponding to the respective meanings are set. When no frame structure data is received and an object in a target page is rasterized, the object ID of the rasterized object and progress information "rasterized" are added to the progress information table 1501. The pointer 1515 to the rasterized bitmap data is also added. When the object is the first one processed in the target page, the page ID 1511 is newly set, and the frame structure data reception flag is set to "false". After receiving frame structure data, all object IDs contained in the frame structure data are added to the progress information table 1501. Rasterized objects are left unchanged. The frame structure data reception flag is set to "true". If no object is rasterized, the page ID 1511 is newly set, and the frame structure data reception flag is set to "true". All object IDs contained in the frame structure data are added to the progress information table 1501.

When a rasterized object is composited to page data, its progress information is rewritten into "composited".

Figure 16A:
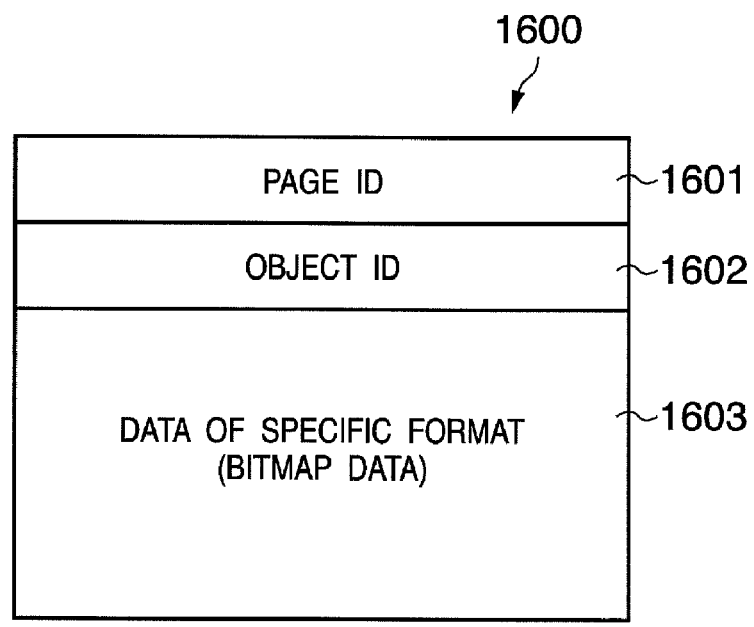
FIGS. 16A and 16B are views showing the structures of an object and page bitmap data.
Figure 16B:
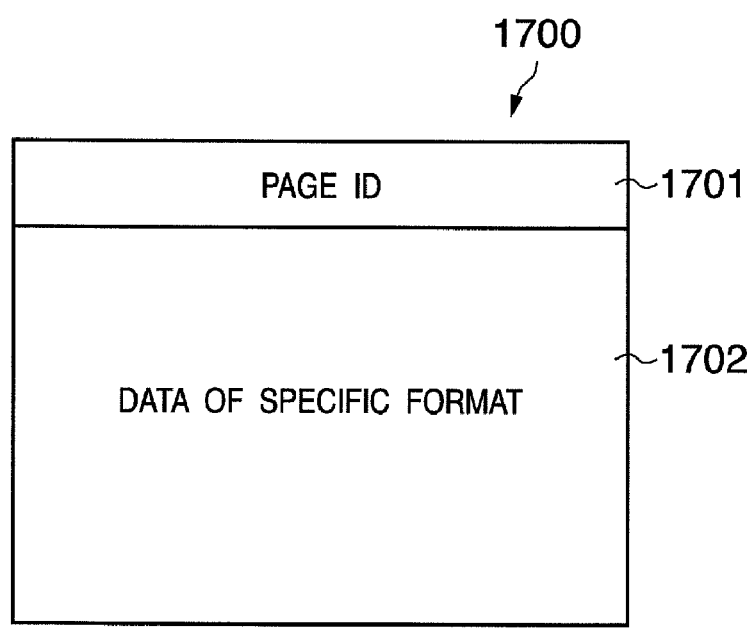

FIG. 16A shows an example of a bitmap data format corresponding to an object rasterized by the rasterization unit. The bitmap data contains a page ID 1601, object ID 1602, and bitmap data 1603. Each rasterization unit receives a page ID and object ID together with object data, and attaches them to output data in output. When receiving the address of bitmap data from each rasterization unit, the composition unit 705 refers to a page ID and object ID to perform registration in the progress information table and composition with page data. FIG. 16B shows page data of one page. This data is also linked from the progress information table by the pointer 1516.

The process in FIG. 14 will be described. The composition unit 705 determines whether it has received, from any rasterization unit, a message representing that rasterization of object data ends (step S1401). The message contains the address of rasterized bitmap data. If the composition unit 705 has received the message, it determines whether it has received frame structure data of a page to which the object belongs (step S1402). If the composition unit 705 has received the frame structure data, it can composite bitmap data to page data. The received data contains the address of bitmap data. The composition unit 705 composites the rasterized bitmap data to page data to which the object belongs (step S1403). The composition unit 705 frees the memory area occupied by the bitmap data of the composited object (step S1404). In this case, the progress information table 1501 also exists in which the object is registered. Thus, "composited" is registered in progress information corresponding to the object (step S1406). The composition unit 705 checks pieces of progress information of all objects in the page to determine whether all the pieces of progress information are "composited" (step S1408). If all the pieces of progress information are "composited", the process of the page data is complete, and the composition unit 705 transfers the page data to the subsequent core unit (step S1409). Then, the composition unit 705 frees the memory area occupied by the page data (step S1410). Then, the process returns to step S1401.

If the composition unit 705 determines in step S1402 that it has not received the frame structure data, it adds items corresponding to the rasterized object, i.e., an object ID, progress information, and pointer to the progress information table (step S1411). How to add an object ID, progress information, and pointer has been described with reference to FIG. 15. The composition unit 705 rewrites the added progress information into "rasterized" (step S1412). Then, the process returns to step S1401.

If the message received in step S1401 is not the object rasterization end notification, the composition unit 705 determines whether it has received frame structure data (S1413). Based on the received frame structure data, the composition unit 705 generates a progress information table (step S1414). How to generate a progress information table has been described with reference to FIG. 15. The composition unit 705 checks the progress information field in the progress information table 1501 to determine whether there is an uncomposited object, i.e., "rasterized" object (step S1415). If YES in step S1415, the composition unit 705 composites bitmap data of the rasterized object to page data (step S1416). The composition unit 705 frees the area occupied by the bitmap data of the composited object (step S1417), and rewrites corresponding progress information into "composited" (step S1418). After that, the process returns to step S1415. If the composition unit 705 determines in step S1413 that it has not received any frame structure data, it executes a process corresponding to received data, and the process returns to step S1401. If the composition unit 705 determines in step S1415 that there is no uncomposited object, the process branches to step S1408 to determine whether composition of all objects is complete.

Figure 17A:
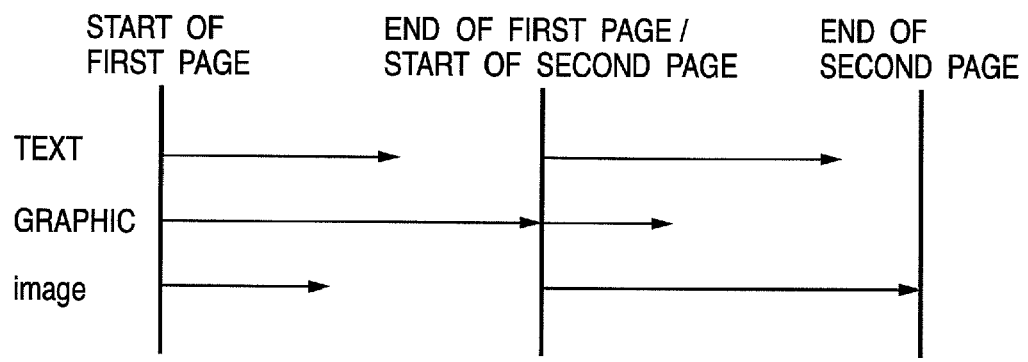
FIGS. 17A and 17B are charts of object rasterization according to the present invention.
Figure 17B:
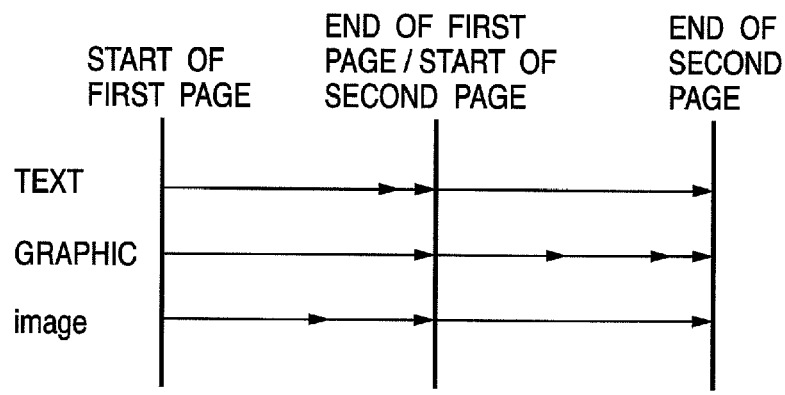

In this way, the rasterization unit can sequentially rasterize objects without synchronizing pages with each other. The composition unit 705 composites rasterized objects, and after completing page data, outputs them. FIGS. 17A and 17B are schematic views of this process. FIG. 17A shows a prior art. Conventionally, rasterization of objects of the next page does not start until all objects of each page are rasterized and composited. To the contrary, the present invention can successively rasterize objects, as shown in FIG. 17B. Frame structure data and the procedures in FIG. 14 using it allow determining whether all objects necessary for a given page are rasterized and composited to page data. As a result, bitmap images successively rasterized from objects can be output by compositing them to page data to which the objects belong.

The first embodiment can efficiently utilize the resource, i.e., rasterization unit of the image forming apparatus for each print job, shortening the print time.

The present invention can successively rasterize and output not only objects belonging to different pages but also objects belonging to different print jobs. In this case, pages contained in a plurality of print jobs and objects belonging to the pages may be parallel-processed. For this purpose, each object must hold a print job ID for identification in addition to the page ID and object ID in FIG. 16A. This also applies to the progress information table.

[Modification 1]

In the first embodiment, the output and input orders of pages may not coincide with each other. This is because object conversion and page data output are not synchronized with each other, and pages whose objects are converted first are sequentially output. To make the input and output orders of pages coincide with each other, step S14085 is interposed between steps S1408 and S1409 in FIG. 14 to check the page order. The criterion of the check is the page ID. In modification 1, page IDs are consecutive in one print job so as to specify the page order. The RAM 707 stores a finally output page ID. In step S14085, the composition unit 705 obtains the page ID of an outputtable page from the progress information table, and determines whether the page ID is a value immediately after a finally output page ID. If the page ID is a value immediately after a finally output page ID, the process advances to step S1409. If the page ID is not a value immediately after a finally output page ID, the process returns to step S1401.

After outputting page data in step S1409, the composition unit 705 searches the progress information table for a page ID immediately after the page ID of the page data. If page data having the page ID is outputtable, the composition unit 705 outputs the page. The page ID of a finally output page is updated to the page ID of an output page. The composition unit 705 repeats this process until all page data are output.

Second Embodiment

The second embodiment will describe an example of using each rasterization unit by switching its function in an apparatus having the same configuration as that in the first embodiment. This operation will be explained with reference to the flowcharts of FIGS. 18 and 19 in an image forming system having the above configuration.

Figure 18:
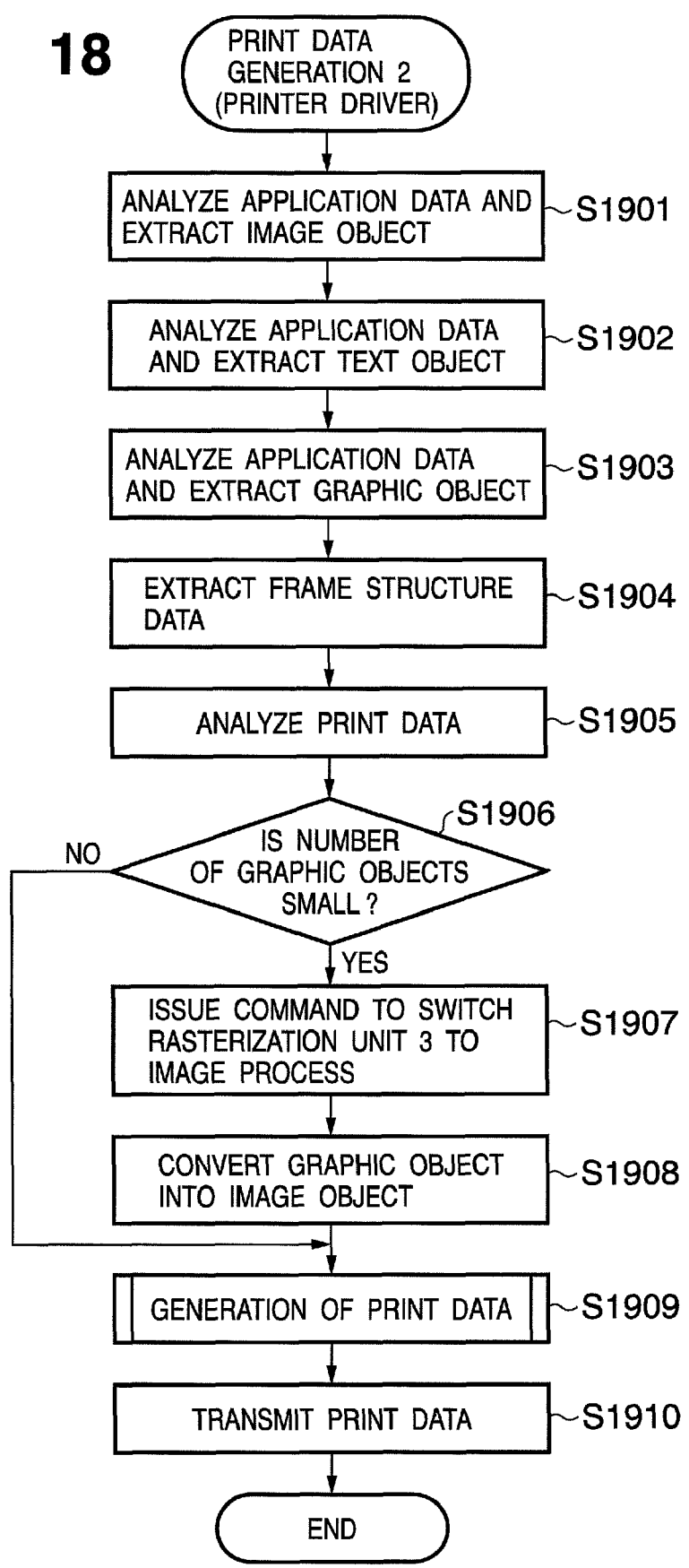
FIG. 18 is a flowchart showing an outline of an operation by a host computer in the second embodiment.

FIG. 18 is a flowchart for explaining the operation of the host (printer driver). The operation of the printer driver will be described first. In step S1901, the printer driver analyzes application data, extracts data to be converted into an image data object, and converts the extracted data into an image data object. In step S1902, the printer driver analyzes the application data, extracts data to be converted into a text data object, and converts the extracted data into a text data object. In step S1903, the printer driver analyzes the application data, extracts data to be converted into a graphic data object, and converts the extracted data into a graphic data object. In step S1904, the printer driver analyzes the application data, and extracts a frame structure to generate frame structure data. In step S1905, the printer driver analyzes these data. In step S1906, the printer driver determines the analysis result and the number of graphic objects. If the number of graphic object is larger than a predetermined value, the process advances to step S1909; if NO, to step S1907. In step S1907, the printer driver transmits a command (function switching command) to switch the function of rasterization unit 3 to a function suitable for an image data process. In step S1908, the printer driver converts a graphic object into an image object. In step S1909, the printer driver generates print data from these data. In step S1910, the printer driver transmits the print data to the image forming apparatus. The process in FIG. 18 is different from that in FIG. 11 in steps S1905 to S1908. The remaining steps are the same as those in FIG. 11. The command, i.e., function switching command has been described in the first embodiment.

Figure 19:
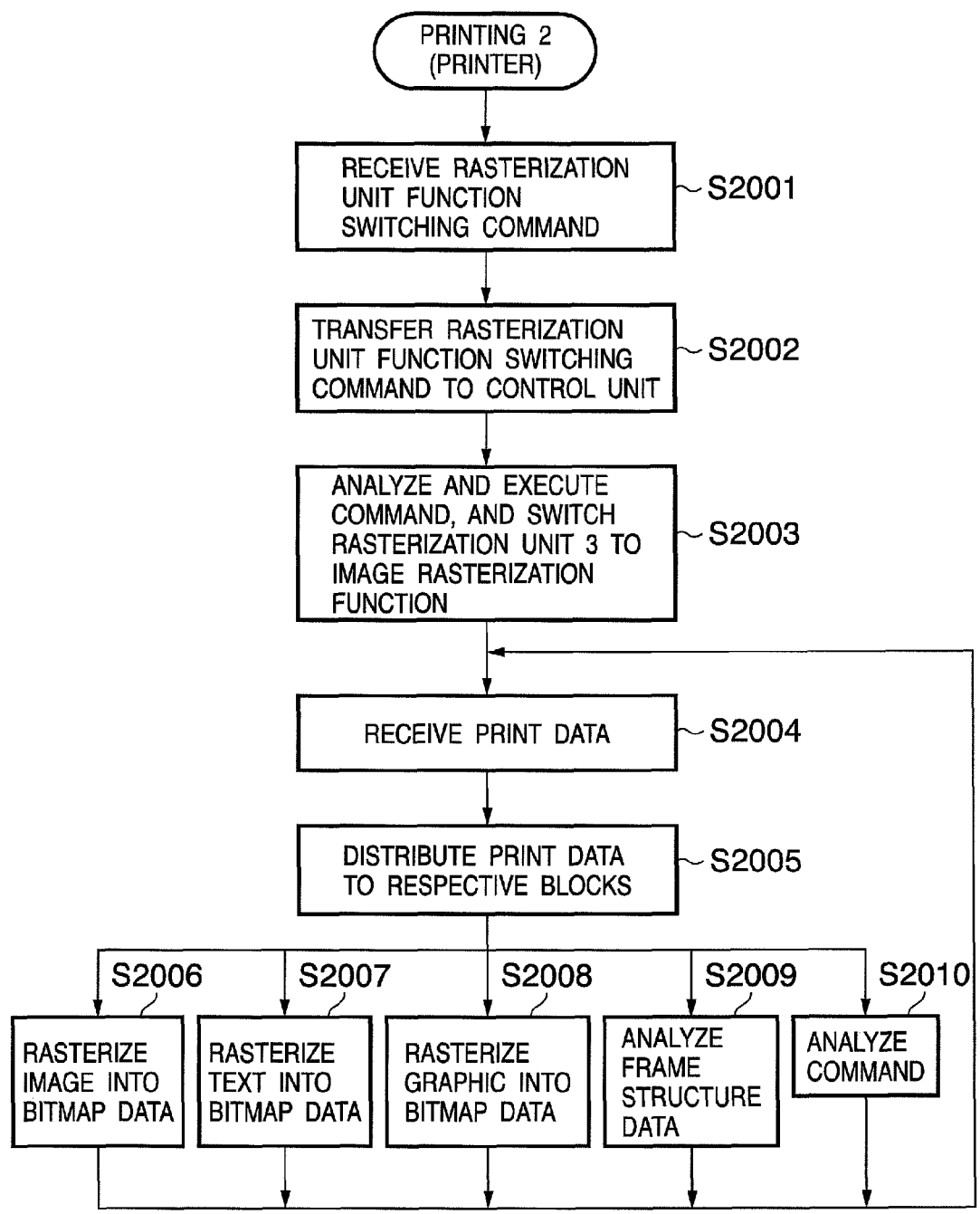
FIG. 19 is a flowchart showing an outline of an operation by a printing apparatus in the second embodiment.

The operation of the printing apparatus will be described with reference to the flowchart of FIG. 19. In step S2001, the printing apparatus receives a transmitted function switching command. In step S2002, the printing apparatus transfers, to a control unit, the function switching command to which predetermined address information is assigned. In step S2003, a control unit 706 analyzes the transferred command to execute a predetermined process. In this case, the control unit 706 switches the function of rasterization unit 3. Rasterization unit 3 originally rasterizes a graphic object, but switches to an image object rasterization function upon execution of this command. How to switch the function has been described in the first embodiment.

In step S2004, the printing apparatus receives print data from the host computer. In step S2005, a data reconstruction unit 701 analyzes the print data transmitted from the host computer, reconstructing data sets to be transferred. The data reconstruction unit 701 transfers the data to a hardware block having a predetermined address in accordance with address information of the destination. Steps S2006 to S2010 are parallel processible. Respective hardware blocks parallel-process data transferred from the data reconstruction unit. In step S2006, a rasterization unit 1 702 rasterizes an image object. In step S2007, a rasterization unit 2 703 rasterizes a text object. In step S2008, a rasterization unit 3 704 rasterizes an image object. In step S2009, a composition unit 705 analyzes frame structure data. In step S2010, the control unit 706 analyzes command data to perform various control operations. The process by the composition unit 705 has been described in the first embodiment with reference to FIG. 14.

As described above, in addition to the effects of the first embodiment, the second embodiment further increases the use efficiency of the rasterization unit serving as a resource of the image forming apparatus by switching the function of the rasterization unit. This is because switching the function can prevent the presence of a rasterization unit which does not perform any process. Accordingly, the second embodiment can execute the print process more quickly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-041657, filed Feb. 17, 2006, which is hereby incorporated by reference herein in its entirety.

What is claimed is:

1. An image forming system comprising:
   an extraction unit, adapted to extract a plurality of types of object from application data;
   a prediction unit, adapted to predict a plurality of rasterization time, each of which is for rasterizing one of the plurality of types of object extracted by the extraction unit into data of a specific format;
   a conversion unit, adapted to convert a type of object into another type of object, in accordance with the plurality of rasterization time predicted by the prediction unit;
   a generation unit, adapted to generate print data including the object extracted by the extraction unit and the object converted by the conversion unit;
   a transmission unit, adapted to transmit the print data generated by the generation unit;
   a reception unit, adapted to receive the print data transmitted by the transmission unit;
   a reconstruction unit, adapted to reconstruct the plurality of types of object from the print data received by the reception unit;
   a plurality of rasterization units, each of which is adapted to rasterize one of the plurality of types of object reconstructed by the reconstruction unit into data of the specific format;
   a composition unit, adapted to composite data of the specific format corresponding to the object rasterized by the plurality of rasterization units, to page data; and
   an image forming unit, adapted to form an image based on the page data.

2. The system according to claim 1, further comprising:
   an acquisition unit, adapted to acquire an operational state of said data rasterization unit; and
   a transmission unit, adapted to transmit the operational state acquired by said acquisition unit.

3. The system according to claim 1, wherein the plurality of types of object includes at least one of an image object, a text object, and a graphic object.

4. The system according to claim 1, wherein each of the rasterization units starts rasterizing an object contained in a second print job immediately after a first print job after an end of rasterizing an object contained in the first print job in rasterizing an object of a type corresponding to each rasterizing unit.

5. The system according to claim 1, wherein data of the specific format is stored in a storage unit,
   when said composition unit composites data of the specific format to the page data, said composition unit frees an area of the storage unit that is occupied by the composited data of the specific format.

6. The system according to claim 1, wherein
   said reception unit also receives frame structure data representing objects contained in each page, and
   the frame structure data is referred to, to determine whether conversion of all objects represented by the frame structure data into data of the specific format.

7. A method of forming an image by an image forming system having an information processing apparatus and an image forming apparatus unit which forms an image represented by data of a specific format on a medium on the basis of the data, wherein the information processing apparatus executes:
   an extraction step of extracting a plurality of types of object from application data;
   a prediction step of predicting a plurality of rasterization time, each of which is for rasterizing one of the plurality of types of object extracted in the extraction step into data of a specific format;
   a conversion step of converting a type of object into another type of object, in accordance with the plurality of rasterization time predicted in the prediction step;
   a generation step of generating print data including the object extracted in the extraction step and the object converted in the conversion step;
   a transmission step of transmitting the print data generated in the generation step, and
   the image forming apparatus executes:
   a reception step of receiving the print data transmitted in the transmission step;

a reconstruction step of reconstructing the plurality of types of object from the print data received in the reception step;

a rasterization step of rasterizing the plurality of types of object by a plurality of rasterization units respectively, the plurality of types of object being reconstructed in the reconstruction step into data of the specific format;

a composition step of compositing the data of the specific format corresponding to the object rasterized by the plurality of rasterization units in the rasterization step, to page data; and an image forming step of forming an image based on the data.

8. A non-transitory computer-readable recording medium including a program that causes a computer to control an image forming apparatus having a reception unit, adapted to receive the print data transmitted by the transmission unit; a reconstruction unit, adapted to reconstruct the plurality of types of object from the print data received by the reception unit; a plurality of rasterization units, each of which is adapted to rasterize one of the plurality of types of object reconstructed by the reconstruction unit into data of the specific format; a composition unit, adapted to composite the data of the specific format corresponding to the object rasterized by the plurality of rasterization units, to page data; and an image forming unit, adapted to form an image based on the page data, the program causing the computer to execute:

an extraction step of extracting a plurality of types of object from application data;

a prediction step of predicting a plurality of rasterization time, each of which is for rasterizing one of the plurality of types of object extracted in the extraction step into data of a specific format;

a conversion step of converting a type of object into another type of object, in accordance with the plurality of rasterization time predicted in the prediction step;

a generation step of generating print data including the object extracted in the extraction step and the object converted in the conversion step; and a transmission step of transmitting the print data generated in the generation step.

9. An information processing apparatus comprising: an extraction unit, adapted to extract a plurality of types of object from application data;

a prediction unit, adapted to predict a plurality of rasterization time, each of which is for rasterizing one of the plurality of types of object extracted by the extraction unit into data of a specific format;

a conversion unit, adapted to convert a type of object into another type of object, in accordance with the plurality of rasterization time predicted by the prediction unit;

a generation unit, adapted to generate print data including the object extracted by the extraction unit and the object converted by the conversion unit;

a transmission unit, adapted to transmit the print data generated by the generation unit.

10. The information processing apparatus according to claim 9 that communicates with an image forming apparatus, the image forming apparatus comprising:

a reception unit, adapted to receive the print data transmitted by the transmission unit;

a reconstruction unit, adapted to reconstruct the plurality of types of object from the print data received by reception unit;

a plurality of rasterization units, each of which is adapted to rasterize one of the plurality of types of object reconstructed by the reconstruction unit into data of the specific format;

a composition unit, adapted to composite the data of the specific format corresponding to the object rasterized by the plurality of rasterization units, to page data; and an image forming unit, adapted to form an image based on the page data.

11. An image forming apparatus comprising:

an image forming unit, adapted to form an image represented by data of a specific format on a medium on the basis of the data;

a reception unit, adapted to receive, from an external apparatus, print data of each page containing object data representing each of a plurality of types of objects;

a data rasterization unit having, for the respective types of objects, object conversion units, each of which is adapted to convert a single type of object into data of the specific format;

a composition unit, adapted to composite data of the specific format corresponding to the object data converted by the plurality of object conversion units, to page data of the specific format containing the object data; and a control unit, adapted to input the page data composited by said composition unit to a subsequent processing unit for each page to use the page data for image formation by said image forming unit, wherein said data rasterization unit converts object data received by said reception unit into data of the specific format regardless of a break of each page containing the object data;

wherein said control unit changes the single type of object to be converted by at least one of the object conversion units, and the plurality of object conversion units parallel-convert object data of one type into the data; and wherein said control unit executes the change in response to a switching instruction received from the external apparatus that sends the switching instruction in accordance with a data amount of object data to be converted by each of the object conversion units.

* * * * *